(12) United States Patent
Wu et al.

(10) Patent No.: US 11,375,495 B2
(45) Date of Patent: Jun. 28, 2022

(54) METHOD AND DEVICE IN UE AND BASE STATION USED FOR WIRELESS COMMUNICATION

(71) Applicants: KeYing Wu, Shanghai (CN); Xiaobo Zhang, Shanghai (CN)

(72) Inventors: KeYing Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 250 days.

(21) Appl. No.: 16/826,329

(22) Filed: Mar. 23, 2020

(65) Prior Publication Data

US 2020/0221438 A1 Jul. 9, 2020

Related U.S. Application Data

(63) Continuation of application No. PCT/CN2019/070612, filed on Jan. 7, 2019.

(30) Foreign Application Priority Data

Jan. 11, 2018 (CN) .......................... 201810027181.5

(51) Int. Cl.
*H04W 72/04* (2009.01)
*H04W 16/14* (2009.01)
*H04W 74/08* (2009.01)

(52) U.S. Cl.
CPC ......... *H04W 72/044* (2013.01); *H04W 16/14* (2013.01); *H04W 72/042* (2013.01); *H04W 74/0808* (2013.01)

(58) Field of Classification Search
CPC ............. H04W 16/14; H04W 74/0808; H04W 72/042; H04W 72/044; H04W 74/0816; H04L 5/0053; H04L 5/0094
See application file for complete search history.

(56) References Cited

U.S. PATENT DOCUMENTS

2016/0381589 A1* 12/2016 Zhang .................. H04L 5/0048
370/252
2019/0090235 A1* 3/2019 Hu ........................ H04W 74/02
2019/0090276 A1* 3/2019 Lee ................... H04W 72/1284

FOREIGN PATENT DOCUMENTS

CN 101128028 A 2/2008
CN 101145828 A 3/2008
(Continued)

OTHER PUBLICATIONS

Feedback Method for Performing Clear Channel Assessment, Device, and Computer Storage Medium, 2017 (Year: 2017).*
(Continued)

*Primary Examiner* — Maharishi V Khirodhar
*Assistant Examiner* — Kenneth P Hunt

(57) ABSTRACT

The present disclosure provides a method and a device in a User Equipment (UE) and a base station used for wireless communication. The UE receives a first signaling, the first signaling being used for determining M time-frequency resources on a first frequency subband, the M time-frequency resources on the first frequency subband being reserved to a first radio signal, and the M being a positive integer; then, the UE determines that the first radio signal can be transmitted in only M1 time-frequency resource(s) among the M time-frequency resources on the first frequency subband, the M1 being a positive integer not greater than the M, and then transmits the first radio signal in the M1 time-frequency resource(s) on the first frequency subband; wherein the first radio signal carries a first bit block, and a number of bits contained in the first bit block is related to the M1.

18 Claims, 23 Drawing Sheets

(56) References Cited

FOREIGN PATENT DOCUMENTS

| CN | 107343297 A | 11/2017 | | |
|---|---|---|---|---|
| EP | 2253115 A1 | 11/2010 | | |
| WO | WO-2017167004 A1 | * | 10/2017 | ............ H04W 72/12 |

OTHER PUBLICATIONS

ISR received in application No. PCT/CN2019/070612 dated Mar. 27, 2019.

* cited by examiner

METHOD AND DEVICE IN UE AND BASE STATION USED FOR WIRELESS COMMUNICATION

CROSS-REFERENCE TO RELATED APPLICATION

This application is a continuation of International Application No. PCT/CN2019/070612, filed on Jan. 7, 2019, claiming the priority benefit of Chinese Application No. 201810027181.5, filed on Jan. 11, 2018, the full disclosure of which is incorporated herein by reference.

BACKGROUND

Technical Field

The present disclosure relates to transmission methods and devices in wireless communication systems, and in particular to a communication method and device supporting data transmission on unlicensed spectrums.

Related Art

Application scenarios of future wireless communication systems are becoming increasingly diversified, and different application scenarios have different performance requirements for systems. In order to meet different performance requirements of various application scenarios, a study item of unlicensed spectrum access under New Radio (NR) was approved in the 3$^{rd}$ Generation Partner Project (3GPP) Radio Access Network (RAN) #75 plenary session. It is expected to accomplish the study item in R15 and then initiate a Work Item (WI) in R16 to standardize relevant technologies. One of important features of the study of unlicensed spectrum in NR is Stand-Alone (SA) unlicensed spectrum services. In order to guarantee compatibility with other access technologies on unlicensed spectrums, in License Assisted Access (LAA) items of Long Term Evolution (LTE), a transmitter (base station or User Equipment (UE)) needs to perform Listen Before Talk (LBT) before transmitting data on the unlicensed spectrums, so as to avoid causing interference to other wireless transmissions that are ongoing on the unlicensed spectrums. If the LBT detects the unlicensed spectrums are occupied by other wireless transmissions, the transmitter cannot transmit radio signals on the unlicensed spectrums. This leads to uncertainty of wireless transmission on unlicensed spectrums.

SUMMARY

The inventor finds through researches that pre-scheduled data may not always be transmitted at a predefined time due to the uncertainty of the LBT. In order to increase transmitting opportunities, a transmitter may perform multiple times of LBT, and occupy channels after the first successful LBT. However, transmissions on unlicensed spectrums must be restricted to a Maximum Channel Occupancy Time (MCOT). When the LTB succeeds, time resources left in the MCOT probably are not enough to transmit predefined information.

In view of the above problems, the present disclosure provides a solution. It should be noted that embodiments in the UE of the present disclosure and the characteristics in the embodiments may be applied to the base station if no conflict is incurred, and vice versa. Further, the embodiments of the present disclosure and the characteristics in the embodiments may be mutually combined if no conflict is incurred.

The present disclosure provides a method in a UE for wireless communication, wherein the method includes:
 receiving a first signaling, the first signaling being used for determining M time-frequency resources on a first frequency subband, the M time-frequency resources on the first frequency subband being reserved to a first radio signal, and the M being a positive integer;
 determining that the first radio signal can be transmitted in only M1 time-frequency resource(s) among the M time-frequency resources on the first frequency subband, the M1 being a positive integer not greater than the M; and
 transmitting the first radio signal in the M1 time-frequency resource(s) on the first frequency subband.

Herein, the first radio signal carries a first bit block, and a number of bits contained in the first bit block is related to the M1.

In one embodiment, the above method is characterized in that: the UE performs LBT on the M time-frequency resources respectively, and starts transmitting the first radio signal on a time-frequency resource corresponding to the first successful LBT. The above method improves the probability of transmission success on unlicensed spectrums.

In one embodiment, the above method is characterized in that: the first radio signal carries uplink control information, and the UE determines the payload of the uplink control information carried in the first radio signal according to the number of available time-frequency resource(s) among the M time-frequency resources, that is, the M1. The advantage of the above method is that part of secondary uplink control information payloads is discarded when there is(are) less available time-frequency resource(s), that is, the M1 is small, so as to guarantee the reliability of transmission of the first radio signal.

In one embodiment, the above method is characterized in that: the first radio signal carries uplink data, and the UE determines the amount of data carried in the first radio signal according to the number of available time-frequency resource(s) among the M time-frequency resources, that is, the M1. The advantage of the above method is that fewer data is transmitted when there is(are) less available time-frequency resource(s), that is, the M1 is small, so as to guarantee the reliability of transmission of the first radio signal.

According to one aspect of the present disclosure, the first bit block includes N1 bit subblock(s) among N bit subblocks, the N is a positive integer, the N1 is a positive integer not greater than the N, and the N1 is related to the M1.

According to one aspect of the present disclosure, for given N and N1, (a) position(s) of the N1 bit subblock(s) in the N bit subblocks is(are) fixed.

In one embodiment, the advantage of the above method is that: a target receiver of the first radio signal knows definitely the content of the information carried by the first radio signal after determining the M1, thus reducing the complexity of blind detection.

According to one aspect of the present disclosure, the number of bits contained in the first bit block decreases with decrease of the M1.

In one embodiment, the advantage of the above method is that: when the quantity of available time-frequency resources is reduced, that is, the M1 decreases, the payload of information in the first bit block is reduced, thus avoiding deterioration of transmission quality of the first bit block due to insufficient available time-frequency resources.

According to one aspect of the present disclosure, the method includes:

performing M2 time(s) of access detection(s) in M2 time window(s) on the first frequency subband respectively.

Herein, the M2 time(s) of access detection(s) is(are) used for determining respectively whether M2 time-frequency resource(s) among the M time-frequency resources on the first frequency sub-band can be used to transmit the first radio signal, and the M2 is a positive integer not greater than the M.

According to one aspect of the present disclosure, the first radio signal includes a first reference signal, and a position of a time-frequency resource occupied by the first reference signal in the M1 time-frequency resource(s) is unrelated to the M1.

In one embodiment, the advantage of the above method is that: a target receiver of the first radio signal may determine (a) position(s) of the M1 time-frequency resource(s) through a detection of the first reference signal, thus reducing the complexity of implementation.

In one embodiment, the advantage of the above method is that: a coherent detection may be performed using a Reference Signal (RS) sequence of the first reference signal, to improve the reliability of detection, thereby determining (a) position(s) of the M1 time-frequency resource(s) more accurately.

According to one aspect of the present disclosure, the method includes:

receiving downlink information.

Herein, the downlink information is used for determining the M.

The present disclosure provides a method in a base station for wireless communication, wherein the method includes:

transmitting a first signaling, the first signaling being used for determining M time-frequency resources on a first frequency subband, the M time-frequency resources on the first frequency subband being reserved to a first radio signal, and the M being a positive integer;

determining it is only needed to receive the first radio signal in M1 time-frequency resource(s) among the M time-frequency resources on the first frequency subband, the M1 being a positive integer not greater than the M; and receiving the first radio signal in the M1 time-frequency resource(s) on the first frequency subband, and recovering a first bit block.

Herein, the first radio signal carries the first bit block, and a number of bits contained in the first bit block is related to the M1.

According to one aspect of the present disclosure, the first bit block includes N1 bit subblock(s) among N bit subblocks, the N is a positive integer, the N1 is a positive integer not greater than the N, and the N1 is related to the M1.

According to one aspect of the present disclosure, for given N and N1, (a) position(s) of the N1 bit subblock(s) in the N bit subblocks is(are) fixed.

According to one aspect of the present disclosure, the number of bits contained in the first bit block decreases with decrease of the M1.

According to one aspect of the present disclosure, the first radio signal includes a first reference signal, and a position of a time-frequency resource occupied by the first reference signal in the M1 time-frequency resource(s) is unrelated to the M1.

According to one aspect of the present disclosure, the method includes:

monitoring the first reference signal in M3 time-frequency resource(s) and detecting the first reference signal in M4 time-frequency resource(s), and stopping monitoring the first reference signal in any of the M time-frequency resources other than the M3 time-frequency resource(s).

Herein, the M3 time-frequency resource(s) is(are) a subset of the M time-frequency resources, the M4 time-frequency resource(s) is(are) a subset of the M3 time-frequency resource(s), the M3 is a positive integer not greater than the M, and the M4 is a positive integer not greater than the M3.

In one embodiment, the advantage of the above method is that: after detecting the first reference signal in the M4 time-frequency resource(s), the base station can stop monitoring the first reference signal on any other time-frequency resource, thereby reducing the complexity of implementation.

According to one aspect of the present disclosure, the method includes:

transmitting downlink information.

Herein, the downlink information is used for determining the M.

The present disclosure provides a UE for wireless communication, wherein the UE includes:

a first receiver, to receive a first signaling, the first signaling being used for determining M time-frequency resources on a first frequency subband, the M time-frequency resources on the first frequency subband being reserved to a first radio signal, and the M being a positive integer;

a first processor, to determine that the first radio signal can be transmitted in only M1 time-frequency resource(s) among the M time-frequency resources on the first frequency subband, the M1 being a positive integer not greater than the M; and a first transmitter, to transmit the first radio signal in the M1 time-frequency resource(s) on the first frequency subband.

Herein, the first radio signal carries a first bit block, and a number of bits contained in the first bit block is related to the M1.

In one embodiment, the above UE for wireless communication is characterized in that: the first bit block includes N1 bit subblock(s) among N bit subblocks, the N is a positive integer, the N1 is a positive integer not greater than the N, and the N1 is related to the M1.

In one embodiment, the above UE for wireless communication is characterized in that: for given N and N1, (a) position(s) of the N1 bit subblock(s) in the N bit subblocks is(are) fixed.

In one embodiment, the above UE for wireless communication is characterized in that: the number of bits contained in the first bit block decreases with decrease of the M1.

In one embodiment, the above UE for wireless communication is characterized in that: the first processor further performs M2 time(s) of access detection(s) in M2 time window(s) on the first frequency subband respectively, wherein the M2 time(s) of access detection(s) is(are) used for determining respectively whether M2 time-frequency resource(s) among the M time-frequency resources on the first frequency sub-band can be used to transmit the first radio signal, and the M2 is a positive integer not greater than the M.

In one embodiment, the above UE for wireless communication is characterized in that: the first radio signal includes a first reference signal, and a position of a time-frequency resource occupied by the first reference signal in the M1 time-frequency resource(s) is unrelated to the M1.

In one embodiment, the above UE for wireless communication is characterized in that: the first receiver further receives downlink information, wherein the downlink information is used for determining the M.

The present disclosure provides a base station for wireless communication, wherein the base station includes:

a second transmitter, to transmit a first signaling, the first signaling being used for determining M time-frequency resources on a first frequency subband, the M time-frequency resources on the first frequency subband being reserved to a first radio signal, and the M being a positive integer;

a second processor, to determine it is only needed to receive the first radio signal in M1 time-frequency resource(s) among the M time-frequency resources on the first frequency subband, the M1 being a positive integer not greater than the M; and a second receiver, to receive the first radio signal in the M1 time-frequency resource(s) on the first frequency subband, and to recover a first bit block.

Herein, the first radio signal carries the first bit block, and a number of bits contained in the first bit block is related to the M1.

In one embodiment, the above base station for wireless communication is characterized in that: the first bit block includes N1 bit subblock(s) among N bit subblocks, the N is a positive integer, the N1 is a positive integer not greater than the N, and the N1 is related to the M1.

In one embodiment, the above base station for wireless communication is characterized in that: for given N and N1, (a) position(s) of the N1 bit subblock(s) in the N bit subblocks is(are) fixed.

In one embodiment, the above base station for wireless communication is characterized in that: the number of bits contained in the first bit block decreases with decrease of the M1.

In one embodiment, the above base station for wireless communication is characterized in that: the first radio signal includes a first reference signal, and a position of a time-frequency resource occupied by the first reference signal in the M1 time-frequency resource(s) is unrelated to the M1.

In one embodiment, the above base station for wireless communication is characterized in that: the second processor further monitors the first reference signal in M3 time-frequency resource(s) and detects the first reference signal in M4 time-frequency resource(s), and stops monitoring the first reference signal in any of the M time-frequency resources other than the M3 time-frequency resource(s), wherein the M3 time-frequency resource(s) is(are) a subset of the M time-frequency resources, the M4 time-frequency resource(s) is(are) a subset of the M3 time-frequency resource(s), the M3 is a positive integer not greater than the M, and the M4 is a positive integer not greater than the M3.

In one embodiment, the above base station for wireless communication is characterized in that: the second transmitter further transmits downlink information, wherein the downlink information is used for determining the M.

In one embodiment, compared with conventional schemes, the present disclosure has the following advantages.

In unlicensed spectrums, the UE can perform LBT at multiple time points and transmit a radio signal after the first successful LBT. This method improves the opportunities of the UE successfully accessing channels on unlicensed spectrums to perform uplink transmission.

In unlicensed spectrums, the UE may determine the quantity of available time-frequency resource(s) according to the result of LBT and then determine the size of the payload of the uplink control information carried in an uplink radio signal. This method allows the UE to discard part of secondary uplink control information when available time-frequency resource(s) is(are) less, to guarantee the reliability of the uplink transmission.

In unlicensed spectrums, the UE may determine the quantity of available time-frequency resource(s) according to the result of LBT and then determine the amount of uplink data carried in an uplink radio signal. This method allows the UE to transmit fewer data when available time-frequency resource(s) is(are) less, to guarantee the reliability of the uplink transmission.

The base station may determine the time resources occupied by an uplink transmission by means of the position of the reference signal, thus reducing the complexity of blind detection, and meanwhile can perform a coherent detection using an RS sequence, thus improving the reliability of detection.

BRIEF DESCRIPTION OF THE DRAWINGS

Other features, purposes and advantages of the present disclosure will become more apparent from the detailed description of non-restrictive embodiments taken in conjunction with the following drawings.

DESCRIPTION OF THE EMBODIMENTS

Embodiment 1

Figure 1:
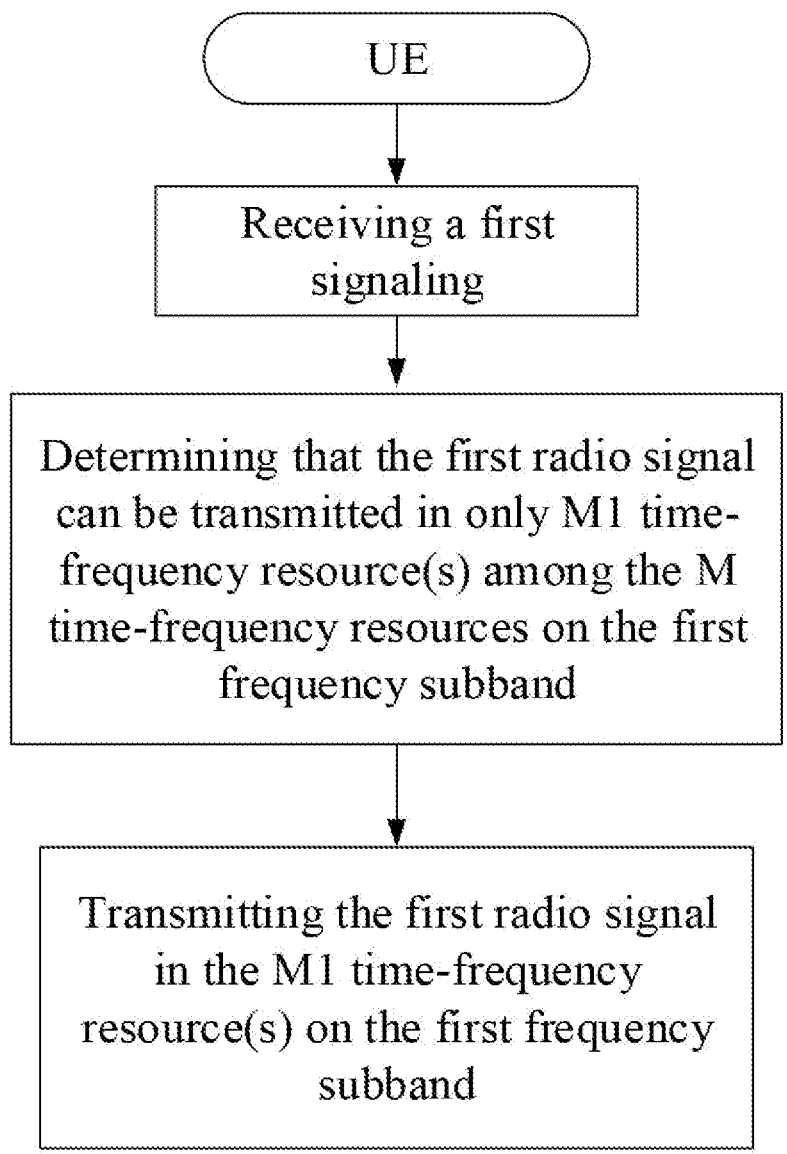
FIG. 1 is a flowchart of a first signaling and a first radio signal according to one embodiment of the present disclosure.

Embodiment 1 illustrates an example of a flowchart of a first signaling and a first radio signal, as shown in FIG. 1.

In Embodiment 1, the UE in the present disclosure receives a first signaling, the first signaling is used for determining M time-frequency resources on a first frequency subband, the M time-frequency resources on the first frequency subband is reserved to a first radio signal, and the M is a positive integer. Then the UE determines that the first radio signal can be transmitted in only M1 time-frequency resource(s) among the M time-frequency resources on the first frequency subband, and the M1 is a positive integer not greater than the M. Next, the UE transmits the first radio signal in the M1 time-frequency resource(s) on the first frequency subband, wherein the first radio signal carries a first bit block, and a number of bits contained in the first bit block is related to the M1.

In one embodiment, the first signaling is a higher-layer signaling.

In one embodiment, the first signaling is a high-layer signaling.

In one embodiment, the first signaling is a Radio Resource Control (RRC) signaling.

In one embodiment, the first signaling is a Medium Access Control layer Control Element (MAC CE) signaling.

In one embodiment, the first signaling is a physical layer signaling.

In one embodiment, the first signaling is UE specific.

In one embodiment, the first signaling indicates explicitly the M time-frequency resources on the first frequency subband.

In one embodiment, the first signaling indicates implicitly the M time-frequency resources on the first frequency subband.

In one embodiment, the M time-frequency resources belong to a first time-frequency resource pool, the first time-frequency resource pool is one candidate time-frequency resource pool among W candidate time-frequency resource pools, one candidate time-frequency resource pool includes a positive integer number of time-frequency resource(s), and the first signaling indicates an index of the first time-frequency resource pool in the W candidate time-frequency resource pools. The W is a positive integer greater than 1.

In one subembodiment, the first time-frequency resource pool consists of the M time-frequency resources.

In one subembodiment, one time-frequency resource includes a positive integer number of multicarrier symbol(s) in a time domain and a positive integer number of subcarriers in a frequency domain.

In one embodiment, the first signaling indicates the M.

In one embodiment, the first frequency subband is deployed on unlicensed spectrums.

In one embodiment, the first frequency subband includes one carrier.

In one embodiment, the first frequency subband includes a plurality of carriers.

In one embodiment, the first frequency subband includes a plurality of Bandwidth Part (BWPs) in one carrier.

In one embodiment, the first frequency subband includes one BWP in one carrier.

In one embodiment, the first frequency subband includes a positive integer number of Physical Resource Blocks (PRBs) in a frequency domain.

In one embodiment, the first frequency subband includes a positive integer number of consecutive PRBs in a frequency domain.

In one embodiment, the first frequency subband includes a positive integer number of Resource Blocks (RBs) in a frequency domain.

In one embodiment, the first frequency subband includes a positive integer number of consecutive RBs in a frequency domain.

In one embodiment, the first frequency subband includes a positive integer number of consecutive subcarriers in a frequency domain.

In one embodiment, the M time-frequency resources are orthogonal (non-overlapping) to one another in a time domain.

In one embodiment, any of the M time-frequency resources occupies a positive integer number of multicarrier symbol(s) in a time domain and occupies a positive integer number of subcarriers in a frequency domain.

In one embodiment, the M is greater than 1.

In one embodiment, the M1 is greater than 0.

In one embodiment, the M time-frequency resources on the first frequency subband are reserved to information carried by the first radio signal.

In one embodiment, the M time-frequency resources on the first frequency subband are reserved to bits in (a) bit block(s) carried by the first radio signal.

In one embodiment, the M time-frequency resources on the first frequency subband are reserved to bits in the first bit block.

In one embodiment, the first signaling is transmitted on the first frequency subband.

In one embodiment, the first signaling is transmitted on a frequency band other than the first frequency subband.

In one embodiment, the first signaling is transmitted on a frequency band deployed on licensed spectrums.

In one embodiment, the UE gives up transmitting the first radio signal on any of the M time-frequency resources other than the M1 time-frequency resource(s).

In one embodiment, the first radio signal includes uplink data.

In one embodiment, the first radio signal includes Uplink Control Information (UCI).

In one embodiment, the first radio signal includes a Hybrid Automatic Repeat Request-Acknowledgement (HARQ-ACK).

In one embodiment, the first radio signal includes a Scheduling Request (RS).

In one embodiment, the first radio signal includes a Channel-state information reference signals Resource Indicator (CRI).

In one embodiment, the first radio signal includes Channel State Information (CSI).

In one subembodiment, the CSI includes one or more of a CRI, a Precoding Matrix Indicator (PMI), a Reference Signal Received Power (RSRP), a Reference Signal Received Quality (RSRQ), and a Channel Quality Indicator (CQI).

In one embodiment, the first signaling includes scheduling information of the first radio signal.

In one embodiment, the first signaling includes Downlink Control Information (DCI).

In one embodiment, the first signaling is a dynamic signaling.

In one embodiment, the first signaling is a dynamic signaling for downlink grant.

In one embodiment, the first signaling is a dynamic signaling for uplink grant.

In one embodiment, scheduling information of the first radio signal includes at least one of {occupied time domain resources, occupied frequency domain resources, a Modulation and Coding Scheme (MCS), a Hybrid Automatic Repeat reQuest (HARD) process number, a Redundancy Version (RV), and a New Data Indicator (NDI)}.

In one embodiment, scheduling information of the first radio signal includes at least one of {occupied time domain resources, occupied frequency domain resources, occupied code domain resources, a cyclic shift, Orthogonal Cover Codes (OCCs), a Physical Uplink Control CHannel (PUCCH) format, and a content of UCI}.

In one embodiment, the phrase that a number of bits contained in the first bit block is related to the M1 refers that: the number of bits contained in the first bit block is related to a value of the M1.

In one embodiment, the phrase that a number of bits contained in the first bit block is related to the M1 refers that: a value of the M1 is used for determining the number of bits contained in the first bit block.

In one embodiment, the phrase that a number of bits contained in the first bit block is related to the M1 refers that: the UE determines the number of bits contained in the first bit block according to a value of the M1.

In one embodiment, the phrase that a given radio signal carries a given bit block refers that: the given radio signal is an output after the given bit block experiences in sequence channel coding, modulation mapper, layer mapper, precoding, resource element mapper, and generation of wideband symbols.

In one embodiment, the phrase that a given radio signal carries a given bit block refers that: the given radio signal is an output after the given bit block experiences in sequence channel coding, modulation mapper, layer mapper, transform precoder (used for generating complex-value signals), precoding, resource element mapper, and generation of wideband symbols.

In one embodiment, the phrase that a given radio signal carries a given bit block refers that: the given bit block is used for generating the given radio signal.

Embodiment 2

Figure 2:
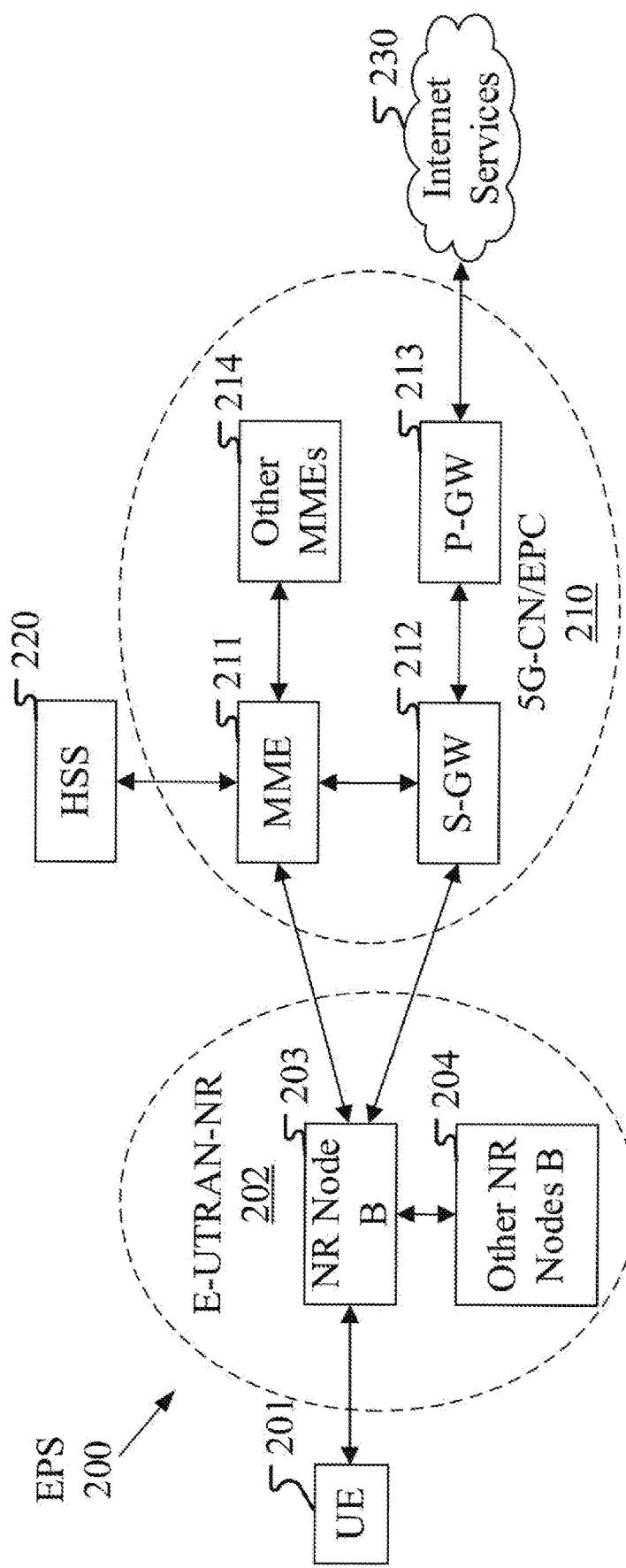
FIG. 2 is a diagram illustrating a network architecture according to one embodiment of the present disclosure.

Embodiment 2 illustrates an example of a diagram of a network architecture, as shown in FIG. 2.

FIG. 2 illustrates a network architecture 200 of Long-Term Evolution (LTE), Long-Term Evolution Advanced (LTE-A) and future 5G systems. The LTE, LTE-A and 5G system network architecture 200 may be called an Evolved Packet System (EPS) 200. The EPS 200 may include one or more UEs 201, an Evolved UMTS Terrestrial Radio Access Network-New Radio (E-UTRAN-NR) 202, a 5G-Core Network/Evolved Packet Core (5G-CN/EPC) 210, a Home Subscriber Server (HSS) 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services. The E-UTRAN-NR includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1 interface. The 5G-CN/EPC 210 includes an MME 211, other MMES 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IPIMSs) and Packet Switching Streaming Services (PSSs).

In one embodiment, the UE 201 corresponds to the UE in the present disclosure.

In one embodiment, the gNB 203 corresponds to the base station in the present disclosure.

In one subembodiment, the UE 201 supports wireless communication of data transmission on unlicensed spectrums.

In one subembodiment, the gNB 203 supports wireless communication of data transmission on unlicensed spectrums.

Embodiment 3

Figure 3:
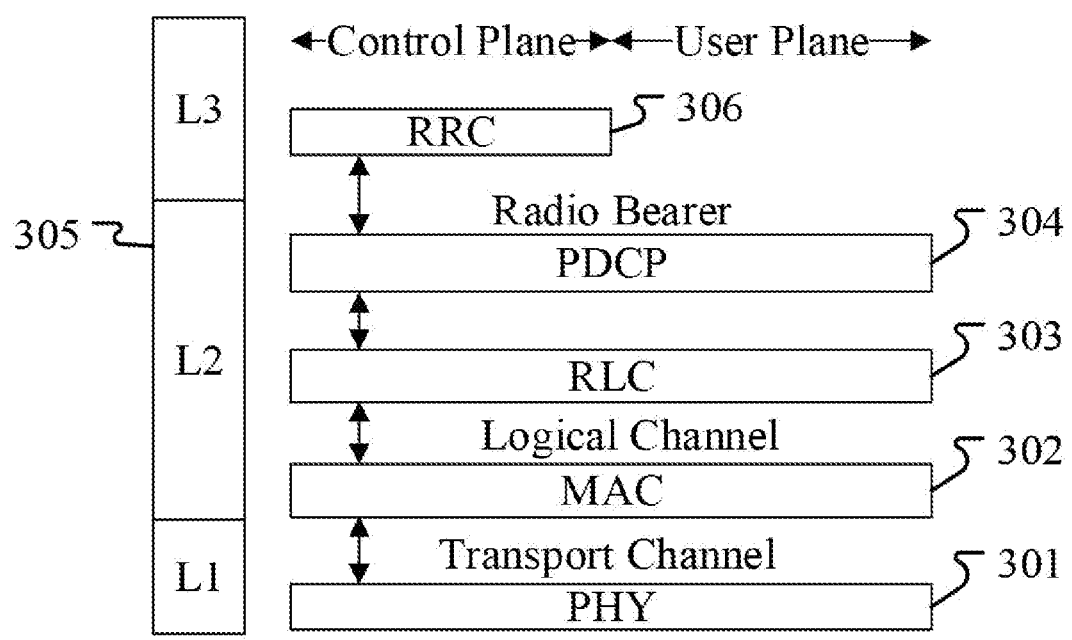
FIG. 3 is a diagram illustrating an embodiment of a radio protocol architecture of a user plane and a control plane according to one embodiment of the present disclosure.

Embodiment 3 illustrates an example of a diagram of an embodiment of a radio protocol architecture of a user plane and a control plane, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at the P-GW 213 of the network side and an application layer terminated at the other side (i.e. a peer UE, a server, etc.) of the connection. The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARD). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring lower layers using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY 301.

In one embodiment, the first signaling in the present disclosure is generated by the MAC sublayer 302.

In one embodiment, the first signaling in the present disclosure is generated by the RRC sublayer 306.

In one embodiment, the first radio signal in the present disclosure is generated by the PHY 301.

In one embodiment, the first bit block in the present disclosure is generated by the PHY 301.

In one embodiment, the first bit block in the present disclosure is generated by the MAC sublayer 302.

In one embodiment, the first bit block in the present disclosure is generated by the RRC sublayer 306.

In one embodiment, the N bit subblocks in the present disclosure are generated by the PHY 301.

In one embodiment, the N bit subblocks in the present disclosure are generated by the MAC sublayer 302.

In one embodiment, the N bit subblocks in the present disclosure are generated by the RRC sublayer 306.

In one embodiment, the downlink information in the present disclosure is generated by the MAC sublayer 302.

In one embodiment, the downlink information in the present disclosure is generated by the RRC sublayer 306.

Embodiment 4

Figure 4:
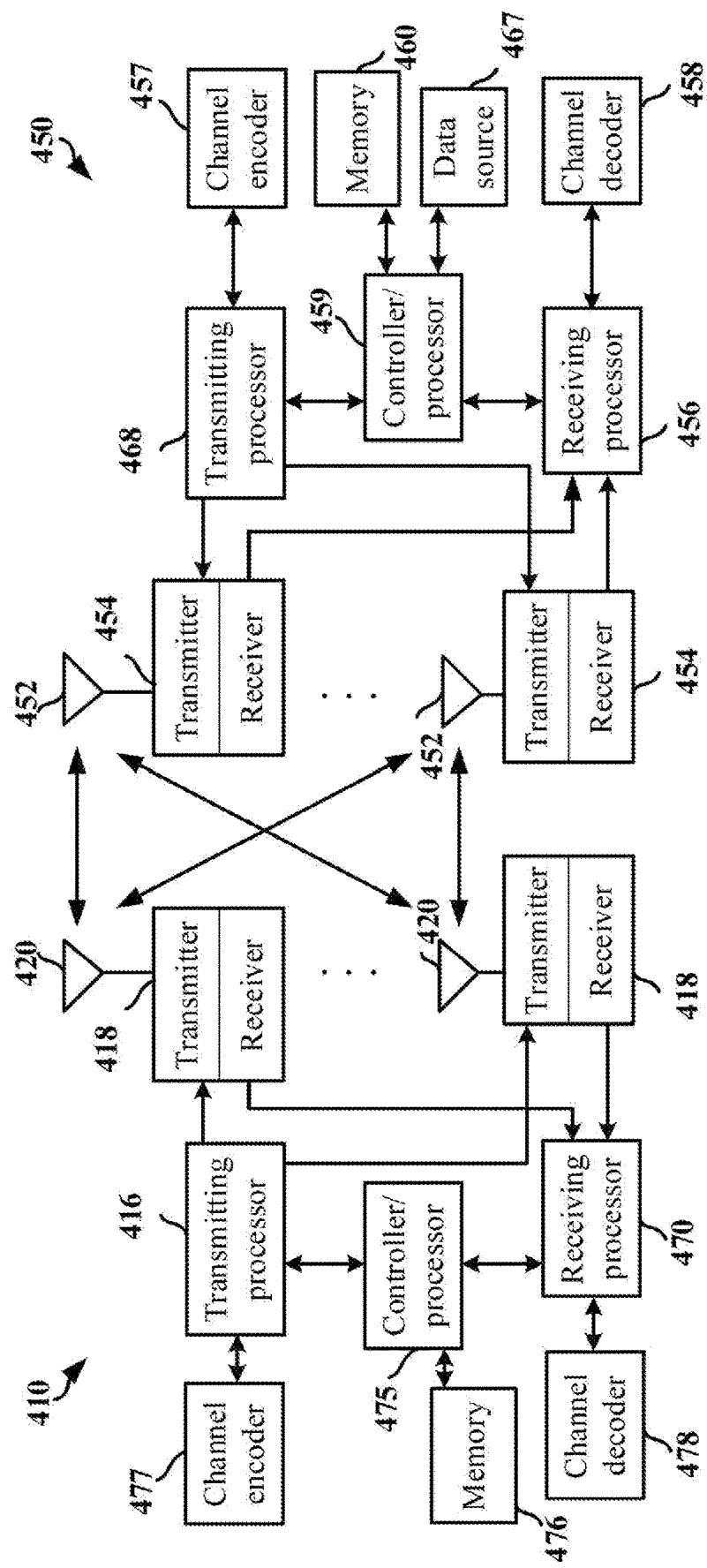
FIG. 4 is a diagram illustrating a New Radio (NR) node and a UE according to one embodiment of the present disclosure.

Embodiment 4 illustrates an example of a diagram of an NR node and a UE, as shown in FIG. 4.

The gNB 410 includes a controller/processor 475, a memory 476, a receiving processor 470, a transmitting processor 416, a channel encoder 477, a channel decoder 478, a transmitter/receiver 418 and an antenna 420.

The UE 450 includes a controller/processor 459, a memory 460, a data source 467, a transmitting processor 468, a receiving processor 456, a channel encoder 457, a channel decoder 458, a transmitter/receiver 454 and an antenna 452.

In Downlink (DL) transmission, at the gNB 410, a higher-layer packet from a core network is provided to the controller/processor 475. The controller/processor 475 provides a function of layer 2. In downlink transmission, the controller/processor 475 provides header compression, encryption, packet segmentation and reordering, multiplexing between a logical channel and a transport channel, and a radio resource allocation for the UE 450 based on various priorities. The controller/processor 475 is also in charge of HARQ operation, retransmission of a lost packet, and a signaling to the UE 450. The transmitting processor 416 and the channel encoder 477 perform signal processing functions used for layer 1 (that is, physical layer). The channel encoder 477 performs encoding and interleaving so as to ensure a FEC (Forward Error Correction) at the UE 450 side. The transmitting processor 416 performs the mapping to signal clusters corresponding to different modulation schemes (i.e., BPSK, QPSK, M-PSK M-QAM, etc.), and processes the encoded and modulated symbols by a digital spatial precoding/beamforming operation to generate one or more spatial streams. The transmitting processor 416 subsequently maps each spatial stream into subcarrier(s) to be multiplexed with reference signal(s) (i.e., pilot) in a time domain and/or frequency domain, and then processes it with Inverse Fast Fourier Transform (IFFT) to generate (a) physical channel(s) carrying a time-domain multicarrier symbol stream. Each transmitter 418 converts a baseband multicarrier symbol stream into a radio frequency stream and then provides it to the corresponding antenna 420.

In downlink transmission, at the UE 450, each receiver 454 receives a signal via the corresponding antenna 452. Each receiver 454 recovers the information modulated to the RF carrier and converts a radio frequency stream into a baseband multicarrier symbol stream to provide to the receiving processor 456. The receiving processor 456 and the channel decoder 458 perform signal processing functions of layer 1. The receiving processor 456 converts the baseband multicarrier symbol stream from a time domain into a frequency domain using FFT (Fast Fourier Transform). In a frequency domain, physical layer data signals and reference signals are demultiplexed by the receiving processor 456, wherein the reference signals are used for channel estimation, and the physical layer data is subjected to multi-antenna detection in the receiving processor 456 to recover any spatial stream targeting the UE 450. Symbols on each spatial stream are demodulated and recovered in the receiving processor 456 to generate a soft decision. Then, the channel decoder 458 decodes and de-interleaves the soft decision to recover the higher-layer data and control signals on the physical channel transmitted by the gNB 410. Next, the higher-layer data and control signals are provided to the controller/processor 459. The controller/processor 459 performs functions of layer 2. The controller/processor 459 can be connected to the memory 460 that stores program codes and data. The memory 460 may be called a computer readable media. In downlink transmission, the controller/processor 459 provides multiplexing between the transport channel and the logical channel, packet reassembling, decryption, header decompression, and control signal processing so as to recover higher-layer packets coming from the core network. The higher-layer packets are then provided to all protocol layers above layer 2, or various control signals can be provided to layer 3 for processing. The controller/processor 459 can also perform error detection using ACK and/or NACK protocols to support the HARQ operation.

In the uplink transmission, at the UE 450, the data source 467 provides a higher-layer packet to the controller/processor 459. The data source 467 represents all protocol layers above L2 layer. Similar as the transmitting function of the gNB 410 described in downlink transmission, the controller/processor 459 provides header compression, encryption, packet segmentation and reordering, and multiplexing between a logical channel and a transport channel based on the radio resource allocation of the base station 410 so as to provide the functions of layer 2 used for the control plane and user plane. The controller/processor 459 is also in charge of HARQ operation, retransmission of a lost packet, and signaling to the gNB 410. The channel encoder 457 performs channel encoding. The encoded data experiences a modulation and multi-antenna spatial precoding/beamforming processing performed by the transmitting processor 468, to be modulated into one or more multicarrier/single-carrier symbol streams, which then is/are provided to the antenna 452 via the transmitter 454. Each transmitter 452 first converts the baseband symbol stream provided by the transmitting processor 468 into a radio frequency symbol stream and then provides the radio frequency symbol stream to the antenna 452.

In uplink transmission, the function of the gNB 410 is similar as the receiving function of the UE 450 described in the downlink transmission. Each receiver 418 receives a radio frequency signal via the corresponding antenna 420, converts the received radio frequency signal into a baseband signal, and provides the baseband signal to the receiving processor 470. The receiving processor 470 and the channel decoder 478 together provide functions of layer 1. The controller/processor 475 provides functions of layer 2. The controller/processor 475 may be connected to the memory 476 that stores program codes and data. The memory 476 may be called a computer readable media. In uplink transmission, the controller/processor 475 provides de-multiplexing between the transport channel and the logical channel, packet reassembling, decryption, header decompression, and control signal processing so as to recover higher-layer packets coming from the UE 450. The higher-layer packets, coming from the controller/processor 475, may be provided to the core network. The controller/processor 475 can also perform error detection using ACK and/or NACK protocols to support the HARQ operation.

In one embodiment, the UE 450 includes at least one processor and at least one memory. The at least one memory includes computer program codes. The at least one memory and the computer program codes are configured to be used in collaboration with the at least one processor. The UE 450 at least receives the first signaling in the present disclosure, the first signaling being used for determining M time-frequency resources on a first frequency subband, and the M time-frequency resources on the first frequency subband being reserved to a first radio signal; determines that the first radio signal can be transmitted in only M1 time-frequency resource(s) among the M time-frequency resources on the first frequency subband; and transmits the first radio signal in the M1 time-frequency resource(s) on the first frequency subband, wherein the first radio signal carries a first bit block, and a number of bits contained in the first bit block is related to the M1.

In one embodiment, the UE 450 includes a memory that stores a computer readable instruction program. The computer readable instruction program generates an action when executed by at least one processor. The action includes: receiving the first signaling in the present disclosure, the first signaling being used for determining M time-frequency resources on a first frequency subband, and the M time-frequency resources on the first frequency subband being reserved to a first radio signal; determining that the first radio signal can be transmitted in only M1 time-frequency resource(s) among the M time-frequency resources on the first frequency subband; and transmitting the first radio signal in the M1 time-frequency resource(s) on the first frequency subband, wherein the first radio signal carries a first bit block, and a number of bits contained in the first bit block is related to the M1.

In one subembodiment, the gNB 410 includes at least one processor and at least one memory. The at least one memory includes computer program codes. The at least one memory and the computer program codes are configured to be used in collaboration with the at least one processor. The gNB 410 at least transmits the first signaling in the present disclosure, the first signaling being used for determining M time-frequency resources on a first frequency subband, and the M time-frequency resources on the first frequency subband being reserved to a first radio signal; determines it is only needed to receive the first radio signal in M1 time-frequency resource(s) among the M time-frequency resources on the first frequency subband; and receives the first radio signal in the M1 time-frequency resource(s) on the first frequency subband, and recovers a first bit block, wherein the first radio signal carries the first bit block, and a number of bits contained in the first bit block is related to the M1.

In one subembodiment, the gNB 410 includes a memory that stores a computer readable instruction program. The computer readable instruction program generates an action when executed by at least one processor. The action includes: transmitting the first signaling in the present disclosure, the first signaling being used for determining M time-frequency resources on a first frequency subband, and the M time-frequency resources on the first frequency subband being reserved to a first radio signal; determining it is only needed to receive the first radio signal in M1 time-frequency resource(s) among the M time-frequency resources on the first frequency subband; and receiving the first radio signal in the M1 time-frequency resource(s) on the first frequency subband, and recovering a first bit block, wherein the first radio signal carries the first bit block, and a number of bits contained in the first bit block is related to the M1.

In one embodiment, the UE 450 corresponds to the UE in the present disclosure.

In one embodiment, the gNB 410 corresponds to the base station in the present disclosure.

In one embodiment, at least one of the antenna 452, the receiver 454, the receiving processor 456, the channel decoder 458, the controller/processor 459, the memory 460 and the data source 467 is used for receiving the first signaling in the present disclosure; and at least one of the antenna 420, the transmitter 418, the transmitting processor 416, the channel encoder 477, the controller/processor 475 and the memory 476 is used for transmitting the first signaling in the present disclosure.

In one embodiment, at least one of the antenna 452, the receiver 454, the receiving processor 456, the channel decoder 458, the controller/processor 459, the memory 460 and the data source 467 is used for determining that the first radio signal can be transmitted in only M1 time-frequency resource(s) among the M time-frequency resources on the first frequency subband.

In one embodiment, at least one of the antenna 420, the transmitter 418, the transmitting processor 416, the channel encoder 477, the controller/processor 475 and the memory 476 is used for receiving the first radio signal; and at least one of the antenna 452, the receiver 454, the receiving processor 456, the channel decoder 458, the controller/processor 459, the memory 460 and the data source 467 is used for transmitting the first radio signal.

In one embodiment, at least one of the antenna 452, the receiver 454, the receiving processor 456 and the controller/processor 459 is used for performing M2 time(s) of access detection(s) in M2 time window(s) on the first frequency subband respectively.

In one embodiment, at least one of the antenna 452, the receiver 454, the receiving processor 456, the channel decoder 458, the controller/processor 459, the memory 460 and the data source 467 is used for receiving the downlink information in the present disclosure; and at least one of the antenna 420, the transmitter 418, the transmitting processor 416, the channel encoder 477, the controller/processor 475 and the memory 476 is used for transmitting the downlink information in the present disclosure.

Embodiment 5

Figure 5:
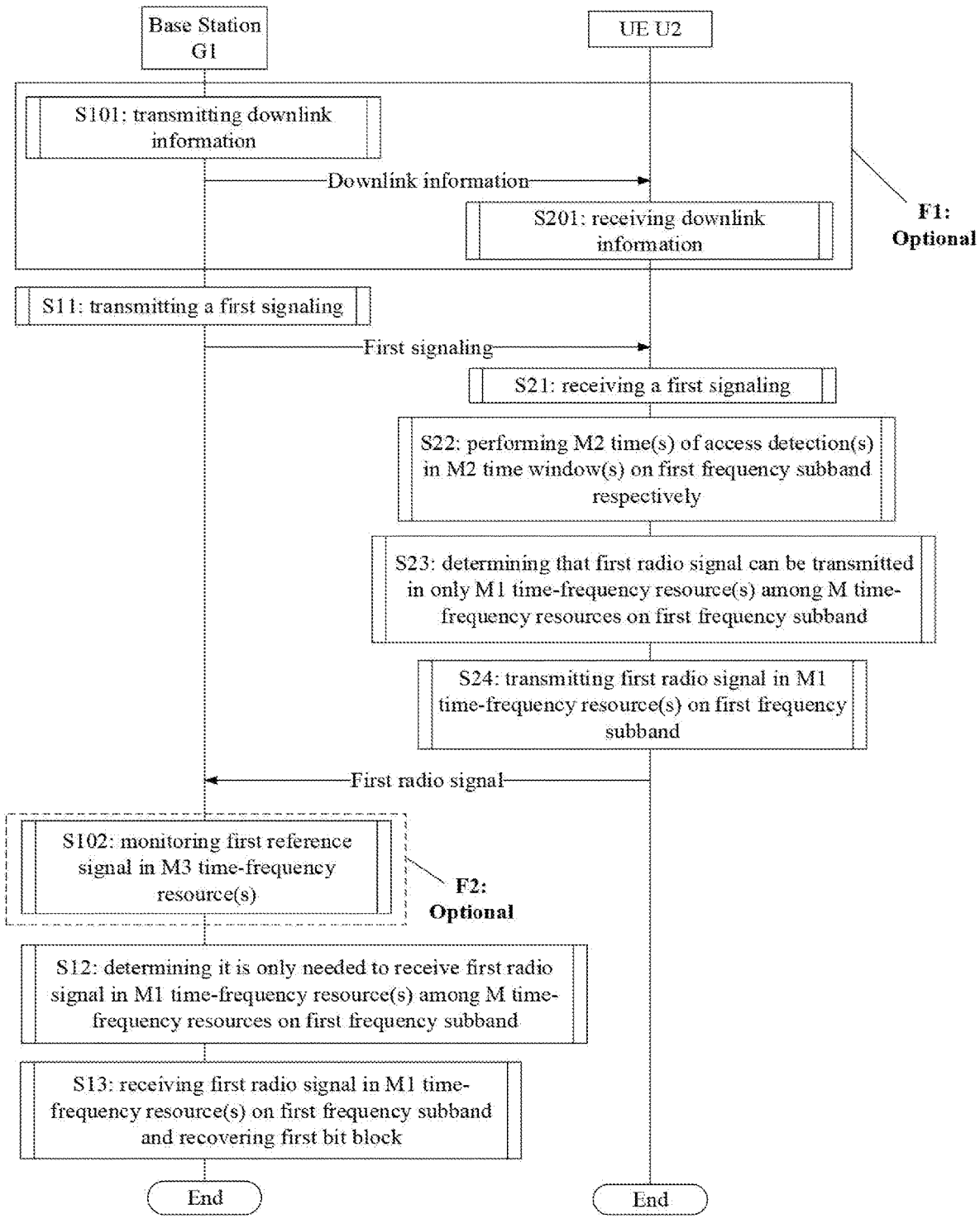
FIG. 5 is a flowchart of a wireless transmission according to one embodiment of the present disclosure.

Embodiment 5 illustrates an example of a flowchart of a wireless transmission, as shown in FIG. 5. In FIG. 5, a base station G1 is a maintenance base station for a serving cell of a UE U2. In FIG. 5, steps in boxes F1 and F2 are optional respectively.

The G1 transmits downlink information in S101, transmits a first signaling in S11, the first signaling being used for determining M time-frequency resources on a first frequency subband and the M time-frequency resources on the first frequency subband being reserved to a first radio signal, monitors a first reference signal in M3 time-frequency resource(s) in S102, determines in S12 it is only needed to receive the first radio signal in M1 time-frequency resource(s) among the M time-frequency resources on the first frequency subband, receives the first radio signal in the M1 time-frequency resource(s) on the first frequency subband and recovers a first bit block in S13.

The U2 receives downlink information in S201, receives a first signaling in S21, the first signaling being used for determining M time-frequency resources on a first frequency subband and the M time-frequency resources on the first frequency subband being reserved to a first radio signal, performs M2 time(s) of access detection(s) in M2 time window(s) on the first frequency subband respectively in S22, determines in S23 that the first radio signal can be transmitted in only M1 time-frequency resource(s) among the M time-frequency resources on the first frequency subband, and transmits the first radio signal in the M1 time-frequency resource(s) on the first frequency subband in S24.

In embodiment 5, the M is a positive integer, the M1 is a positive integer not greater than the M, the first radio signal carries the first bit block, and a number of bits contained in the first bit block is related to the M1. The M2 time(s) of access detection(s) is(are) used by the U2 to determine respectively whether M2 time-frequency resource(s) among the M time-frequency resources on the first frequency subband can be used to transmit the first radio signal, and the M2 is a positive integer not greater than the M. The first radio signal includes the first reference signal. The M3 time-frequency resource(s) is(are) a subset of the M time-frequency resources, and the M3 is a positive integer not greater than the M. The G1 detects the first reference signal in M4 time-frequency resource(s), the M4 time-frequency resource(s) is(are) a subset of the M3 time-frequency resource(s), and the M4 is a positive integer not greater than the M3. The downlink information is used for determining the M.

In one embodiment, the first bit block includes N1 bit subblock(s) among N bit subblocks, the N is a positive integer, the N1 is a positive integer not greater than the N, and the N1 is related to the M1.

In one subembodiment, for given N and N1, (a) position(s) of the N1 bit subblock(s) in the N bit subblocks is(are) fixed.

In one embodiment, the number of bits contained in the first bit block decreases with the decrease of the M1.

In one embodiment, the M2 time(s) of access detection(s) is(are) used by the U2 to determine that the M1 time-frequency resource(s) among the M time-frequency resources can be used to transmit the first radio signal, In one embodiment, the M2 time(s) of access detection(s) is(are) used by the U2 to determine whether the first frequency subband is idle, respectively.

In one embodiment, the M2 time(s) of access detection(s) is(are) uplink access detection(s) respectively.

In one embodiment, the G1 determines, according to an energy detection, whether it is needed to receive the first radio signal in one of the M time-frequency resources on the first frequency subband.

In one subembodiment, the energy detection refers to: sensing energies of radio signals in a given time-frequency resource and averaging the energies over time to obtain a reception energy. If the reception energy is greater than a first given threshold, it is determined that it is needed to receive the first radio signal in the given time-frequency resource. Otherwise, it is determined that it is not needed to receive the first radio signal in the given time-frequency resource. The given time-frequency resource is one of the M time-frequency resources.

In one embodiment, the G1 determines using a coherent detection whether it is needed to receive the first radio signal in one of the M time-frequency resources on the first frequency subband, according to a Reference Signal (RS) sequence of the first reference signal.

In one subembodiment, the coherent detection refers to: performing a coherent reception for radio signals in a given time-frequency resource using the RS sequence of the first reference signal, and measuring an energy of a signal obtained after the coherent reception. If the energy of the signal obtained after the coherent reception is greater than a second given threshold value, it is determined that it is needed to receive the first radio signal in the given time-frequency resource. Otherwise, it is determined that it is not needed to receive the first radio signal in the given time-frequency resource. The given time-frequency resource is one of the M time-frequency resources.

In one embodiment, the G1 determines, according to a blind detection, whether it is needed to receive the first radio signal in one of the M time-frequency resources on the first frequency subband.

In one subembodiment, the blind detection refers to: receiving signals in a given time-frequency resource and performing decoding. If the decoding is determined to be correct according to check bits, it is determined that it is needed to receive the first radio signal in the given time-frequency resource. Otherwise, it is determined that it is not needed to receive the first radio signal in the given time-frequency resource. The given time-frequency resource is one of the M time-frequency resources.

In one reference embodiment of the above subembodiment, the check bits refers to Cyclic Redundancy Check (CRC) bits.

In one embodiment, if the G1 determines that it is needed to receive the first radio signal in a given time-frequency resource of the M time-frequency resource, the G1 determines that it is needed to receive the first radio signal in any of the M time-frequency resources that is located behind the given time-frequency resource in a time domain.

In one embodiment, the G1 needs to receive the first radio signal in the M4 time-frequency resource(s).

In one embodiment, the G1 does not need to receive the first radio signal in any of the M time-frequency resources that is located before the M4 time-frequency resource(s) in a time domain.

In one embodiment, the G1 does not need to receive the first radio signal in any of the M time-frequency resources that is located before the M4 time-frequency resource(s) in a time domain and has a time interval to an earliest one of the M4 time-frequency resource(s) not less than a third threshold. The third threshold is a non-negative real number.

In one subembodiment, the third threshold is in units of multicarrier symbols.

In one subembodiment, the third threshold is in units of ms.

In one embodiment, the G1 needs to receive the first radio signal in any of the M time-frequency resources that is located behind the M4 time-frequency resource(s) in a time domain.

In one embodiment, a position of a time-frequency resource occupied by the first reference signal in the M1 time-frequency resource(s) is unrelated to the M1.

In one embodiment, the G1 stops monitoring the first reference signal in any of the M time-frequency resources other than the M3 time-frequency resource(s).

In one embodiment, the downlink information is carried by a higher-layer signaling.

In one embodiment, the downlink information is carried by a high-layer signaling.

In one embodiment, the downlink information is carried by an RRC signaling.

In one embodiment, the downlink information is carried by an MAC CE signaling.

In one embodiment, the downlink information is carried by a physical layer signaling.

In one embodiment, the downlink information indicates the M.

In one embodiment, the downlink information is transmitted on the first frequency subband.

In one embodiment, the downlink information is transmitted on a frequency band other than the first frequency subband.

In one embodiment, the first signaling is transmitted on a frequency band deployed on licensed spectrums.

In one embodiment, the first signaling is transmitted on a downlink physical layer data channel (that is, a downlink channel capable of carrying physical layer data).

In one subembodiment, the downlink physical layer data channel is a Physical Downlink Shared CHannel (PDSCH).

In one subembodiment, the downlink physical layer data channel is a short PDSCH (sPDSCH).

In one subembodiment, the downlink physical layer data channel is a New Radio PDSCH (NR-PDSCH).

In one subembodiment, the downlink physical layer data channel is a Narrow Band PDSCH (NB-PDSCH).

In one embodiment, the first signaling is transmitted on a downlink physical layer control channel (that is, a downlink channel capable of carrying physical layer signalings only).

In one subembodiment, the downlink physical layer control channel is a Physical Downlink Control CHannel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

In one embodiment, the first radio signal is transmitted on an uplink physical layer control channel (that is, an uplink channel capable of carrying physical layer signalings only).

In one subembodiment, the uplink physical layer control channel is a Physical Uplink Control CHannel (PUCCH).

In one subembodiment, the uplink physical layer control channel is a short PUCCH (sPUCCH).

In one subembodiment, the uplink physical layer control channel is a New Radio PUCCH (NR-PUCCH).

In one subembodiment, the uplink physical layer control channel is a Narrow Band PUCCH (NB-PUCCH).

In one embodiment, a transport channel corresponding to the first radio signal is an Uplink Shared Channel (UL-SCH).

In one embodiment, the downlink information is transmitted on a downlink physical layer data channel (that is, a downlink channel capable of carrying physical layer data).

In one subembodiment, the downlink physical layer data channel is PDSCH.

In one subembodiment, the downlink physical layer data channel is a sPDSCH.

In one subembodiment, the downlink physical layer data channel is an NR-PDSCH.

In one subembodiment, the downlink physical layer data channel is an NB-PDSCH.

In one embodiment, the first signaling is transmitted on a downlink physical layer control channel (that is, a downlink channel capable of carrying physical layer signaling s).

In one subembodiment, the downlink physical layer control channel is a PDCCH.

In one subembodiment, the downlink physical layer control channel is a sPDCCH.

In one subembodiment, the downlink physical layer control channel is an NR-PDCCH.

In one subembodiment, the downlink physical layer control channel is an NB-PDCCH.

Embodiment 6

Figure 6:
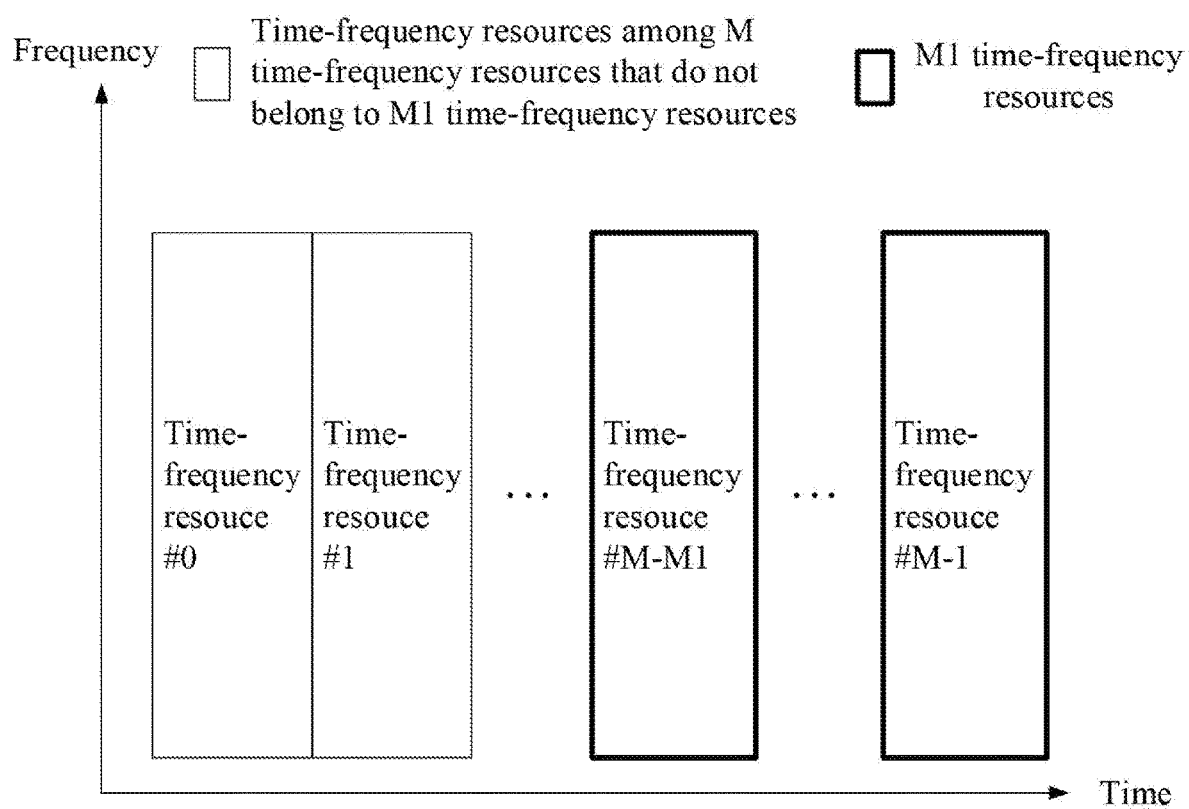
FIG. 6 is a diagram illustrating resource mappings of M time-frequency resources and M1 time-frequency resource(s) in a time-frequency domain according to one embodiment of the present disclosure.

Embodiment 6 illustrates an example of a diagram of resource mappings of M time-frequency resources and M1 time-frequency resource(s) in a time-frequency domain, as shown in FIG. 6.

In Embodiment 6, the M1 time-frequency resource(s) is(are) a subset of the M time-frequency resources, the M time-frequency resources are orthogonal (non-overlapping) to one another in the time domain, and the M1 time-frequency resource(s) is(are) M1 last consecutive time-frequency resource(s) among the M time-frequency resource(s).

In FIG. 6, boxes having fine line frames represent time-frequency resource(s) among the M time-frequency resources that do not belong to the M1 time-frequency resource(s); boxes having heavy line frames represent the M1 time-frequency resource(s); and indexes of the M time-frequency resources are {#0, #1, ..., #M−1} respectively.

In one embodiment, the M time-frequency resources are consecutive in the time domain.

In one embodiment, at least two of the M time-frequency resources are inconsecutive in the time domain.

In one embodiment, any two of the M time-frequency resources occupy a same length of time resources.

In one embodiment, at least two of the M time-frequency resources occupy different lengths of time resources.

In one embodiment, any of the M time-frequency resources occupies one subframe in the time domain.

In one embodiment, any of the M time-frequency resources occupies a positive integer number of subframes in the time domain.

In one embodiment, any of the M time-frequency resources occupies a positive integer number of consecutive subframes in the time domain.

In one embodiment, any of the M time-frequency resources occupies one slot in the time domain.

In one embodiment, any of the M time-frequency resources occupies a positive integer number of slots in the time domain.

In one embodiment, any of the M time-frequency resources occupies a positive integer number of consecutive slots in the time domain.

In one embodiment, any of the M time-frequency resources occupies one multicarrier symbol in the time domain.

In one embodiment, any of the M time-frequency resources occupies a positive integer number of multicarrier symbols in the time domain.

In one embodiment, any of the M time-frequency resources occupies a positive integer number of consecutive multicarrier symbols in the time domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol contains a Cyclic Prefix (CP).

In one embodiment, any two of the M time-frequency resources occupy same frequency resources.

In one embodiment, any of the M time-frequency resources occupies a positive integer number of subcarriers in the frequency domain.

In one embodiment, any of the M time-frequency resources occupies a positive integer number of consecutive subcarriers in the frequency domain.

In one embodiment, any of the M time-frequency resources occupies a positive integer number of Physical Resource Blocks (PRBs) in the frequency domain.

In one embodiment, any of the M time-frequency resources occupies a positive integer number of consecutive PRBs in the frequency domain.

In one embodiment, any of the M time-frequency resources occupies a positive integer number of Resource Blocks (RBs) in the frequency domain.

In one embodiment, any of the M time-frequency resources occupies a positive integer number of consecutive RBs in the frequency domain.

In one embodiment, any of the M time-frequency resources includes a positive integer number of Resource Elements (REs).

In one embodiment, any of the M time-frequency resources consists of a positive integer number of REs.

In one embodiment, any two of the M time-frequency resources occupy a same number of REs.

In one embodiment, at least two of the M time-frequency resources occupy different numbers of REs.

In one embodiment, one RE occupies one multicarrier symbol in the time domain and one subcarrier in the frequency domain.

In one embodiment, the M is greater than 1.

In one embodiment, the M is a positive integer not less than 4 but not greater than 14.

In one embodiment, the M1 is equal to the M.

In one embodiment, the M1 is less than the M.

In one embodiment, the M1 is greater than 0.

In one embodiment, positions of the M1 time-frequency resources in the M time-frequency resources are consecutive.

In one embodiment, the M1 time-frequency resource(s) is(are) M1 last time-frequency resource(s) among the M time-frequency resources.

In one embodiment, the M1 time-frequency resource(s) is(are) M1 time-frequency resource(s) with (a) greatest index(es) among the M time-frequency resources.

Embodiment 7

Figure 7:
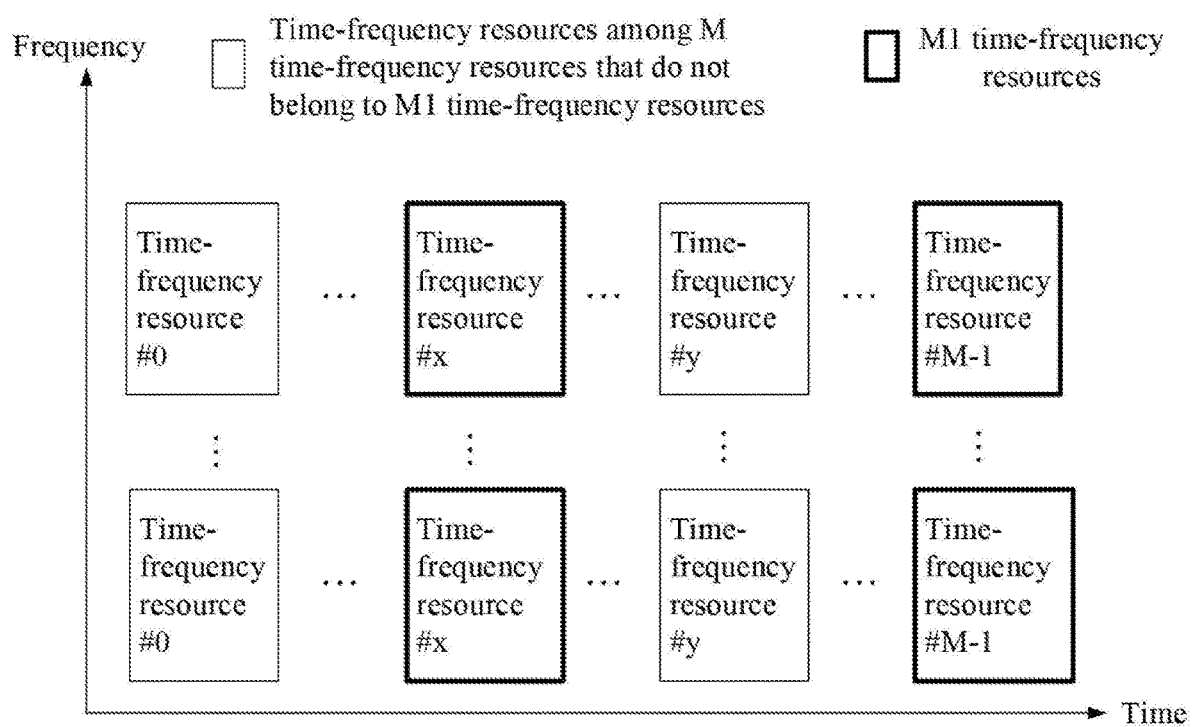
FIG. 7 is a diagram illustrating resource mappings of M time-frequency resources and M1 time-frequency resource(s) in a time-frequency domain according to one embodiment of the present disclosure.

Embodiment 7 illustrates an example of a diagram of resource mappings of M time-frequency resources and M1 time-frequency resource(s) in a time-frequency domain, as shown in FIG. 7.

In Embodiment 7, the M1 time-frequency resource(s) is(are) a subset of the M time-frequency resources, and the M time-frequency resources are orthogonal (non-overlapping) to one another in the time domain.

In FIG. 7, boxes having fine line frames represent time-frequency resource(s) among the M time-frequency resources that do not belong to the M1 time-frequency resource(s); boxes having heavy line frames represent the M1 time-frequency resource(s); and indexes of the M time-frequency resources are {#0, . . . , #x, #y, #M−1} respectively, wherein the x and the y are positive integers less than the M−1 respectively, and the y is greater than the x.

In one embodiment, at least two of the M time-frequency resources occupy different frequency resources.

In one embodiment, any of the M time-frequency resources occupies a positive integer of inconsecutive subcarriers in the frequency domain.

In one embodiment, any of the M time-frequency resources occupies a positive integer of inconsecutive PRBs in the frequency domain.

In one embodiment, any of the M time-frequency resources occupies a positive integer of inconsecutive RBs in the frequency domain.

In one embodiment, at least two of the M1 time-frequency resources are at inconsecutive positions in the M time-frequency resources.

In one embodiment, at least two of the M1 time-frequency resources have inconsecutive indexes in the M time-frequency resources.

Embodiment 8

Figure 8:
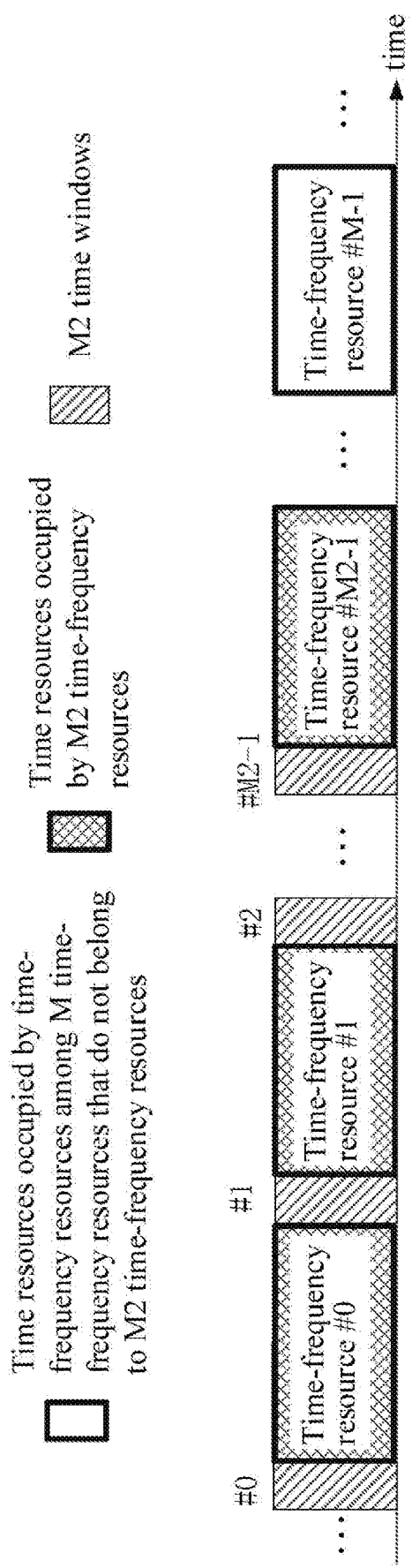
FIG. 8 is a diagram illustrating a sequential relationship between M time-frequency resources and M2 time window(s) in a time domain according to one embodiment of the present disclosure.

Embodiment 8 illustrates an example of a diagram of a sequential relationship between M time-frequency resources and M2 time window(s) in a time domain, as shown in FIG. 8.

In Embodiment 8, the M time-frequency resources are reserved to the first radio signal in the present disclosure, and the UE in the present disclosure determines that the first radio signal can be transmitted in only M1 time-frequency resource(s) among the M time-frequency resources; the UE performs M2 time(s) of access detection(s) in M2 time window(s) respectively, the M2 time(s) of access detection(s) is(are) used by the UE to determine respectively whether M2 time-frequency resource(s) among the M time-frequency resources can be used to transmit the first radio signal, the M2 time-frequency resource(s) is(are) M2 earliest time-frequency resource(s) among the M time-frequency resources in the time domain, and the M2 is less than the M.

In FIG. 8, boxes having heavy line frames and filled by cross lines represent time resources occupied by the M2 time-frequency resource(s), blank boxes having heavy line frames represent time resources occupied by time-frequency resource(s) among the M time-frequency resources that do not belong to the M2 time-frequency resource(s), and boxes having fine line frames and filled by left slashes represent the M2 time window(s). The M time-frequency resources are represented by {a time-frequency resource #0, a time-frequency resource #1, . . . , a time-frequency resource #M−1} respectively, and indexes of the M2 time window(s) is(are) {#0, #1, #2, . . . , #M2−1} respectively.

In one embodiment, any of the M2 time window(s) is a continuous period of time.

In one embodiment, the M2 time windows are orthogonal (non-overlapping) to one another in the time domain.

In one embodiment, any two of the M2 time windows have a same duration of time in the time domain.

In one embodiment, at least two of the M2 time windows have different durations of time in the time domain.

In one embodiment, an end time of the M2 time window(s) is not later than a start time of the M2 time-frequency resource(s) in the time domain respectively.

In one embodiment, a time window #x is located within time resources occupied by a time-frequency resource #x−1 in the time domain, and the x is a positive integer less than the M2.

In one embodiment, a time window #x overlaps partially with time resources occupied by a time-frequency resource #x−1 in the time domain, and the x is a positive integer less than the M2.

In one embodiment, positions of the M2 time-frequency resources in the M time-frequency resources are consecutive.

In one embodiment, the M2 time-frequency resource(s) is(are) M2 earliest time-frequency resource(s) among the M time-frequency resources in the time domain.

In one embodiment, the M2 time-frequency resource(s) is(are) M2 time-frequency resource(s) with (a) smallest index(es) among the M time-frequency resources.

In one embodiment, the M2 time-frequency resource(s) consist of a time-frequency resource #0, a time-frequency resource #1, . . . , and a time-frequency resource #M2−1.

In one embodiment, the M2 plus the M1 in the present disclosure is equal to the M plus 1.

In one embodiment, the M2 is less than the M.

In one embodiment, the M1 time-frequency resource(s) in the present disclosure consist of a last one of the M2 time-frequency resource(s) in the time domain and all time-frequency resources among the M time-frequency resources that are behind the M2 time-frequency resource(s) in the time domain.

In one embodiment, the M1 time-frequency resources consist of a time-frequency resource #M2−1, a time-frequency resource #M2, . . . , and a time-frequency resource #M−1.

In one embodiment, the M2 time(s) of access detection(s) is(are) used for determining that the M1 time-frequency resource(s) among the M time-frequency resources can be used to transmit the first radio signal.

In one embodiment, the M2 time(s) of access detection(s) indicate(s) that the M1 time-frequency resource(s) among the M time-frequency resources can be used to transmit the first radio signal.

In one embodiment, the M2 time(s) of access detection(s) indicate(s) the M1.

In one embodiment, the M2 time(s) of access detection(s) indicate(s) (a) position(s) of the M1 time-frequency resource(s) in the M time-frequency resources.

In one embodiment, the M2 time(s) of access detection(s) indicate(s) that any of earliest M2−1 time-frequency resource(s) among the M time-frequency resources in the time domain cannot be used to transmit the first radio signal.

In one embodiment, the M2 time(s) of access detection(s) indicate(s) that a M2th time-frequency resource among the M time-frequency resources in the time domain can be used to transmit the first radio signal.

In one embodiment, the M2 time(s) of access detection(s) indicate(s) that any of the M time-frequency resources that is located behind a M2th time-frequency resource in the time domain can be used to transmit the first radio signal.

In one embodiment, the M2 time(s) of access detection(s) indicate(s) that any of earliest M2−1 time-frequency resource(s) among the M2 time-frequency resource(s) in the time domain cannot be used to transmit the first radio signal.

In one embodiment, the M2 time(s) of access detection(s) indicate(s) that a last one of the M2 time-frequency resource(s) in the time domain can be used to transmit the first radio signal.

In one embodiment, the M2 time(s) of access detection(s) indicate(s) that any time-frequency resource with an index less than the M2 among the M time-frequency resources cannot be used to transmit the first radio signal.

In one embodiment, the M2 time(s) of access detection(s) indicate(s) that a time-frequency resource with an index equal to the M2 among the M time-frequency resources can be used to transmit the first radio signal.

In one embodiment, the M2 time(s) of access detection(s) indicate(s) that any time-frequency resource with an index greater than the M2 among the M time-frequency resources can be used to transmit the first radio signal.

In one embodiment, the M1 time-frequency resource(s) consist(s) of a last one of the M2 time-frequency resource(s) in the time domain and all of the M time-frequency resources that are behind the M2 time-frequency resource(s) in the time domain.

In one embodiment, the M2 time(s) of access detection(s) is(are) used for determining whether the first frequency subband is idle, respectively.

In one embodiment, for any given access detection among the M2 time(s) of access detection(s), if the given access detection is used for determining that the first frequency subband is idle, a time-frequency resource corresponding to the given access detection can be used to transmit the first radio signal; otherwise, the time-frequency resource corresponding to the given access detection cannot be used to transmit the first radio signal.

In one reference embodiment of the above embodiment, if the given access detection is used for determining that the first frequency subband is idle, any of the M time-frequency resources that is located in the time domain behind the time-frequency resource corresponding to the given access detection can be used to transmit the first radio signal.

In one embodiment, only one of the M2 time(s) of access detection(s) is used for determining that the first frequency subband is idle, and any other of the M2 times of access detections is used for determining that the first frequency subband is non-idle.

In one embodiment, only a last one of the M2 time(s) of access detection(s) is used for determining that the first frequency subband is idle, and any other of the M2 times of access detections is used for determining that the first frequency subband is non-idle.

In one embodiment, only one of the M2 time(s) of access detection(s) is used for determining that the first frequency subband can be used to transmit the first radio signal, and any other of the M2 times of access detections is used for determining that the first frequency subband cannot be used to transmit the first radio signal.

In one embodiment, only a last one of the M2 time(s) of access detection(s) is used for determining that the first frequency subband can be used to transmit the first radio signal, and any other of the M2 times of access detections is used for determining that the first frequency subband cannot be used to transmit the first radio signal.

In one embodiment, for any given access detection among the M2 time(s) of access detection(s), the given access detection includes performing Q times of energy detections in Q time subpools in a given time window respectively to obtain Q detection values; wherein the given time window is one of the M2 time window(s) that is corresponding to the given access detection, Q1 detection value(s) among the Q detection values is(are) each less than a first threshold, the Q is a positive integer, and the Q1 is a non-negative integer not greater than the Q.

In one subembodiment, if the Q1 is equal to a second threshold, a time-frequency resource corresponding to the given access detection can be used to transmit the first radio signal; if the Q1 is less than the second threshold, the time-frequency resource corresponding to the given access detection cannot be used to transmit the first radio signal; wherein the second threshold is a non-negative integer.

In one subembodiment, if the Q1 is equal to a second threshold, any of the M time-frequency resources that is located behind a given time-frequency resource in the time domain can be used to transmit the first radio signal, and the given time-frequency resource is one of the M2 time-frequency resource(s) that is corresponding to the given access detection, and the second threshold is a non-negative integer.

In one subembodiment, if the given access detection is the last one of the M2 time(s) of access detection(s), the Q1 is equal to a second threshold; otherwise, the Q1 is less than the second threshold, and the second threshold is a non-negative integer.

Embodiment 9

Figure 9:
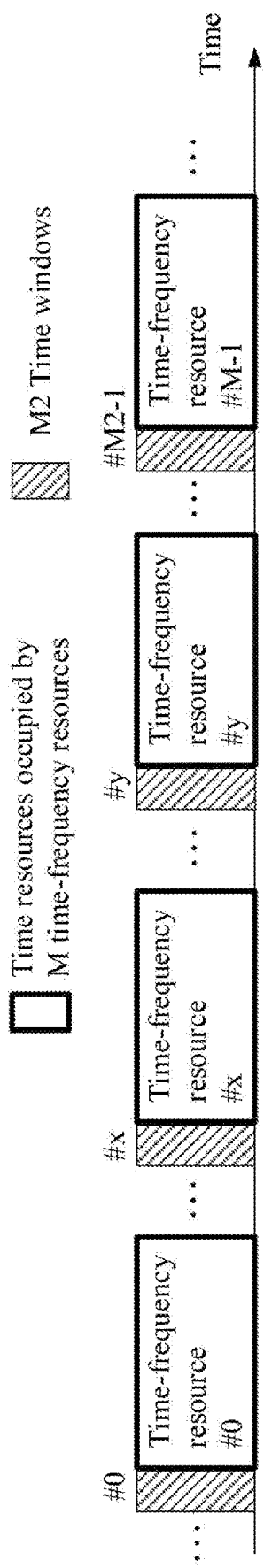
FIG. 9 is a diagram illustrating a sequential relationship between M time-frequency resources and M2 time window(s) in a time domain according to one embodiment of the present disclosure.

Embodiment 9 illustrates an example of a diagram of a sequential relationship between M time-frequency resources and M2 time window(s) in a time domain, as shown in FIG. 9.

In Embodiment 9, the M time-frequency resources are reserved to the first radio signal in the present disclosure, and the UE in the present disclosure determines that the first radio signal can be transmitted in only M1 time-frequency resource(s) among the M time-frequency resources; the UE performs M2 time(s) of access detection(s) in M2 time window(s) respectively, the M2 time(s) of access detection(s) is(are) used by the UE to determine respectively whether M2 time-frequency resource(s) among the M time-frequency resources can be used to transmit the first radio signal, and the M2 is equal to the M.

In FIG. 9, blank boxes having heavy line frames represent the M time-frequency resources, and boxes having fine line frames and filled by left slashes represent the M2 time window(s). The M time-frequency resources are represented by {a time-frequency resource #0, . . . , a time-frequency resource #x, . . . , a time-frequency resource #y, . . . , a time-frequency resource #M−1} respectively, and indexes of the M2 time windows are {#0, #x, . . . , #y, . . . , #M2−1} respectively.

In one embodiment, the M2 is equal to the M.

In one embodiment, the M2 time-frequency resources are the M time-frequency resources.

In one embodiment, the M2 is greater than the M1.

In one embodiment, the M2 is equal to the M1.

In one embodiment, only M1 time(s) of access detection(s) among the M2 times of access detections is(are) used for determining that the first frequency subband is idle, and any of the M2 times of access detections other than the M1 times of access detections is used for determining that the first frequency subband is non-idle. The M1 time(s) of access detection(s) is(are) corresponding to the M1 time-frequency resource(s) respectively.

In one embodiment, for any given access detection among the M2 time(s) of access detection(s), the given access detection includes performing Q times of energy detections in Q time subpools in a given time window respectively to obtain Q detection values; wherein the given time window is a time window among the M2 time window(s) that is corresponding to the given access detection, Q1 detection values among the Q detection values are each less than a first threshold, the Q is a positive integer, and the Q1 is a non-negative integer not greater than the Q.

In one subembodiment, if a time-frequency resource corresponding to the given access detection belongs to the M1 time-frequency resource(s), the Q1 is equal to a second threshold; otherwise, the Q1 is less than the second threshold, wherein the second threshold is a non-negative integer.

Embodiment 10

Figure 10:
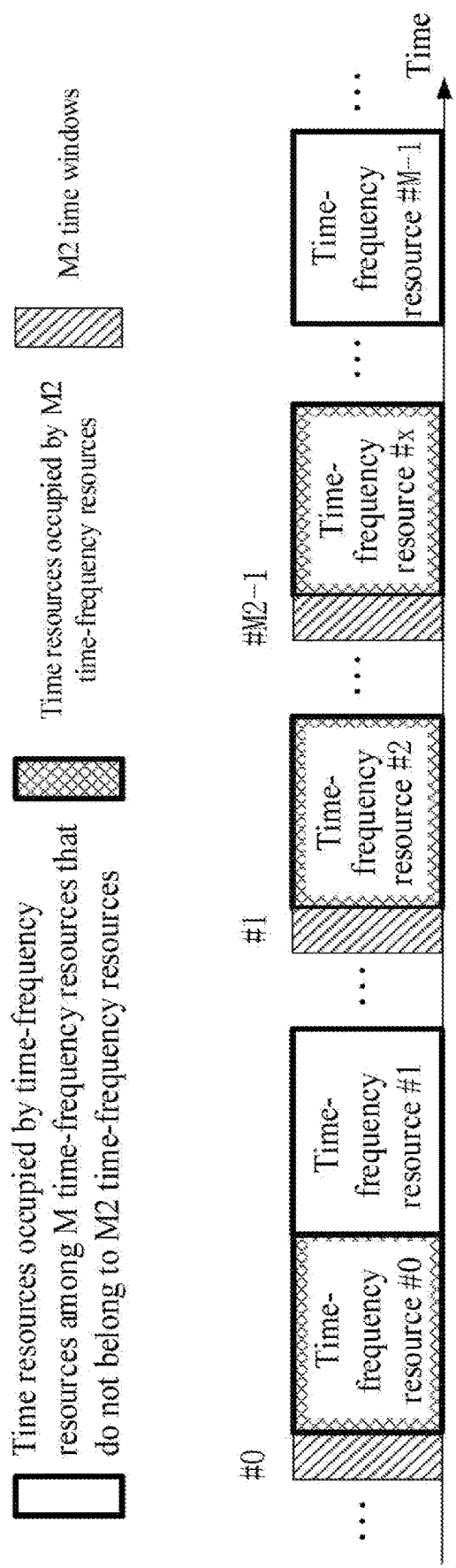
FIG. 10 is a diagram illustrating a sequential relationship between M time-frequency resources and M2 time window(s) in a time domain according to one embodiment of the present disclosure.

Embodiment 10 illustrates an example of a diagram of a sequential relationship between M time-frequency resources and M2 time window(s) in a time domain, as shown in FIG. 10.

In Embodiment 10, the M time-frequency resources are reserved to the first radio signal in the present disclosure, and the UE in the present disclosure determines that the first radio signal can be transmitted in only M1 time-frequency resource(s) among the M time-frequency resources; the UE performs M2 time(s) of access detection(s) in M2 time window(s) respectively, the M2 time(s) of access detection(s) is(are) used by the UE to determine respectively whether M2 time-frequency resource(s) among the M time-frequency resources be used to transmit the first radio signal, and the M2 is less than the M.

In FIG. 10, boxes having heavy line frames and filled by cross lines represent time resources occupied by the M2 time-frequency resource(s), blank boxes having heavy line frames represent time resources occupied by time-frequency resources among the M time-frequency resources that do not belong to the M2 time-frequency resources, and boxes having fine line frames and filled by left slashes represent the M2 time window(s). The M time-frequency resources are represented by {a time-frequency resource #0, a time-frequency resource #1, . . . , a time-frequency resource #x, a time-frequency resource #M−1} respectively, and indexes of the M2 time windows are {#0, . . . , #M2−1} respectively, wherein the x is a positive integer less than the M−1 but greater than 2.

In one embodiment, at least two adjacent time-frequency resources among the M2 time-frequency resources are at inconsecutive positions in the M time-frequency resources.

In one embodiment, multiple times of access detections among the M2 times of access detections are used for determining that the first frequency subband is idle.

In one embodiment, multiple times of access detections among the M2 times of access detections are used for determining that the first frequency subband can be used to transmit the first radio signal.

In one embodiment, a time-frequency resource #A and a time-frequency resource #B are two time-frequency resources among the M2 time-frequency resources respectively, positions of the time-frequency resource #A and the time-frequency resource #B in the M2 time-frequency resources are consecutive, positions of the time-frequency resource #A and the time-frequency resource #B in the M time-frequency resources are inconsecutive, the A and the B are positive integers less than the M respectively, and the B is greater than the A. The time-frequency resource #B and a time-frequency resource #B−1 are inconsecutive in the time domain.

In one subembodiment, in FIG. 10, a time-frequency resource #0 and a time-frequency resource #2 are two time-frequency resources among the M2 time-frequency resources respectively, positions of the time-frequency resource #0 and the time-frequency resource #2 in the M2 time-frequency resources are consecutive, positions of the time-frequency resource #0 and the time-frequency resource #2 in the M time-frequency resources are inconsecutive, and the time-frequency resource #2 and a time-frequency resource #1 are inconsecutive in the time domain.

In one subembodiment, if the time-frequency resource #A is determined by a corresponding access detection to be available to transmit the first radio signal, any time-frequency resource among the M time-frequency resources that is located in the time domain between the time-frequency resource #A and the time-frequency resource #B is determined to be also available to transmit the first radio signal. For example, in FIG. 10, if the time-frequency resource #0 is determined to be available to transmit the first radio signal, the time-frequency resource #1 is determined to be also available to transmit the first radio signal.

In one embodiment, for any given time-frequency resource among the M2 time-frequency resource(s), the given time-frequency resource is determined by a corresponding access detection to be available to transmit the first radio signal. If a positive integer number of time-frequency resource(s) among the M time-frequency resources is(are) located behind the given time-frequency resource in the time domain, meanwhile the given time-frequency resource and the positive integer number of time-frequency resource(s) are consecutive in the time domain, the positive integer number of time-frequency resource(s) is(are) determined to be also available to transmit the first radio signal.

Embodiment 11

Figure 11:
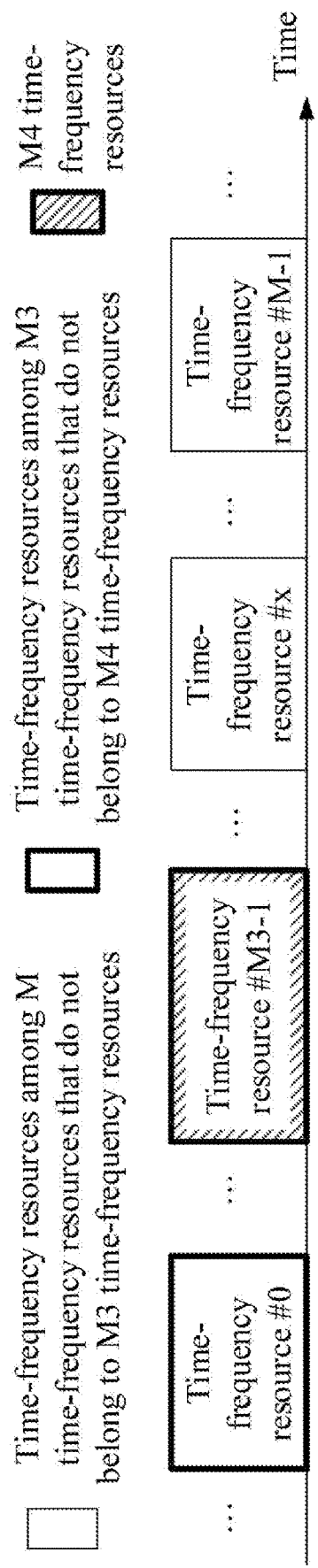
FIG. 11 is a diagram illustrating a relationship between M time-frequency resources and M3 time-frequency resource(s) in a time domain according to one embodiment of the present disclosure.

Embodiment 11 illustrates an example of a diagram of a relationship between M time-frequency resources and M3 time-frequency resource(s) in a time domain, as shown in FIG. 11.

In Embodiment 11, the M time-frequency resources are reserved to the first radio signal in the present disclosure, and the base station in the present disclosure determines that it is only needed to receive the first radio signal in M1 time-frequency resource(s) among the M time-frequency resources. The first radio signal includes a first reference signal, and the base station monitors the first reference signal in M3 time-frequency resource(s) and detects the first reference signal in M4 time-frequency resource(s). Herein, the M3 time-frequency resource(s) is(are) a subset of the M time-frequency resources, the M4 time-frequency resource(s) is(are) a subset of the M3 time-frequency resource(s), the M3 is a positive integer not greater than the M, and the M4 is a positive integer not greater than the M3.

In FIG. 11, blank boxes having fine line frames represent time-frequency resources among the M time-frequency resources that do not belong to the M3 time-frequency resource(s), a blank box having a heavy line frame represents a time-frequency resource among the M3 time-frequency resources that does not belong to the M4 time-frequency resource(s), and a box having a heavy line frame and filled by left slashes represents the M4 time-frequency resource(s). The M time-frequency resources are represented by {a time-frequency resource #0, a time-frequency resource #x, time-frequency resource #M−1} respectively, wherein the x is a positive integer less than the M−1.

In one embodiment, the base station stops monitoring the first reference signal in any of the M time-frequency resources other than the M3 time-frequency resource(s).

In one embodiment, the M4 time-frequency resource(s) is(are) used by the base station to determine that it is only needed to receive the first radio signal in the M1 time-frequency resource(s) among the M time-frequency resources.

In one embodiment, (a) position(s) of the M4 time-frequency resource(s) in the M time-frequency resources is(are) used by the base station to determine that it is only needed to receive the first radio signal in the M1 time-frequency resource(s) among the M time-frequency resources.

In one embodiment, the M4 time-frequency resource(s) is(are) used for determining the M1 time-frequency resource(s).

In one embodiment, (a) position(s) of the M4 time-frequency resource(s) in the M time-frequency resources is(are) used for determining the M1 time-frequency resource(s).

In one embodiment, the M4 time-frequency resource(s) is(are) used for determining (a) position(s) of the M1 time-frequency resource(s) in the M time-frequency resources.

In one embodiment, (a) position(s) of the M4 time-frequency resource(s) in the M time-frequency resources is(are) used for determining (a) position(s) of the M1 time-frequency resource(s) in the M time-frequency resources.

In one embodiment, the M4 time-frequency resource(s) is(are) used for determining the M1.

In one embodiment, (a) position(s) of the M4 time-frequency resource(s) in the M time-frequency resource(s) is(are) used for determining the M1.

In one embodiment, positions of the M3 time-frequency resources in the M time-frequency resources are consecutive.

In one embodiment, the M3 time-frequency resource(s) is(are) M3 earliest time-frequency resource(s) among the M time-frequency resources in the time domain.

In one embodiment, the M3 time-frequency resource(s) is(are) M3 time-frequency resource(s) with (a) smallest index(es) among the M time-frequency resources.

In one embodiment, the M4 is equal to 1.
In one embodiment, the M4 is greater than 1.
In one embodiment, the M4 is less than the M3.
In one embodiment, the M4 is equal to the M3.
In one embodiment, the M4 time-frequency resource is a last one of the M3 time-frequency resource(s) in the time domain.

In one embodiment, the M4 time-frequency resource is one of the M3 time-frequency resource(s) that has a greatest index in the M time-frequency resources.

In one embodiment, the M4 time-frequency resource(s) is(are) M4 last time-frequency resource(s) among the M3 time-frequency resource(s) in the time domain.

In one embodiment, the M4 time-frequency resource(s) is(are) M4 time-frequency resource(s) among the M3 time-frequency resource(s) that has(have) (a) greatest index(es) in the M time-frequency resources.

In one embodiment, the M3 plus the M1 is equal to the M plus 1.

In one embodiment, the base station determines that it is needed to receive the first radio signal in the M4 time-frequency resource(s).

In one embodiment, the base station determines that it is not needed to receive the first radio signal in any of the M time-frequency resources that is located before the M4 time-frequency resource(s) in the time domain.

In one embodiment, the base station determines that it is not needed to receive the first radio signal in any of the M time-frequency resources that is located before the M4 time-frequency resource(s) in the time domain and have time intervals to an earliest one of the M4 time-frequency resource(s) not less than a third threshold. The third threshold is a non-negative real number.

In one subembodiment, the third threshold is in units of multicarrier symbols.

In one subembodiment, the third threshold is in units of ms.

In one subembodiment, the third threshold is equal to 0.
In one subembodiment, the third threshold is greater than 0.

In one embodiment, the base station needs to receive the first radio signal in any of the M time-frequency resources that is located behind the M4 time-frequency resource(s) in the time domain.

In one embodiment, the M1 time-frequency resources consist of a last one of the M3 time-frequency resource(s) in the time domain and all time-frequency resources among the M time-frequency resources that are behind the M3 time-frequency resource(s) in the time domain.

In one embodiment, the M1 time-frequency resources consist of {a last one of the M3 time-frequency resource(s) in the time domain, all time-frequency resources among the M time-frequency resources that are located before the M4 time-frequency resource(s) in the time domain and have time intervals to an earliest one of the M4 time-frequency resource(s) less than a third threshold, all time-frequency resources among the M time-frequency resources that are behind the M3 time-frequency resource(s) in the time domain}.

In one embodiment, the base station monitors the first reference signal via an energy detection, that is, determining, according to the energy detection, whether the first reference signal is detected in each of the M3 time-frequency resource(s).

In one subembodiment, the energy detection refers to: sensing energies of all radio signals in a given time-frequency resource and averaging the energies over time to obtain a reception energy. If the reception energy is greater than a first given threshold, it is determined that the first reference signal is detected in the given time-frequency resource; otherwise, it is determined that the first reference signal is not detected in the given time-frequency resource. The given time-frequency resource is any of the M3 time-frequency resource(s).

In one embodiment, the base station monitors the first reference signal via a coherent detection using an RS sequence of the first reference signal, that is, determining using the coherent detection whether the first reference signal is detected in each of the M3 time-frequency resource(s), according to the RS sequence of the first reference signal.

In one subembodiment, the coherent detection refers to: performing a coherent reception for all radio signals in a given time-frequency resource using the RS sequence of the first reference signal, and measuring an energy of a signal obtained after the coherent reception. If the energy of the signal obtained after the coherent reception is greater than a second given threshold value, it is determined the first reference signal is detected in the given time-frequency resource; otherwise, it is determined the first reference signal is not detected in the given time-frequency resource. The given time-frequency resource is any of the M3 time-frequency resource(s).

In one embodiment, the base station monitors the first reference signal via a blind detection, that is, determining, according to the blind detection, whether the first reference signal is detected in each of the M3 time-frequency resource(s).

In one subembodiment, the blind detection refers to: receiving signals in a given time-frequency resource and performing decoding. If the decoding is determined to be correct according to check bits, it is determined that the first reference signal is detected in the given time-frequency resource; otherwise, it is determined the first reference signal is not detected in the given time-frequency resource. The given time-frequency resource is any of the M3 time-frequency resource(s).

In one reference embodiment of the above subembodiment, the check bits refer to CRC bits.

In one embodiment, the M3 is equal to the M.

In one embodiment, the M3 is less than the M.

In one embodiment, the M3 is greater than 1.

In one embodiment, the M3 is equal to 1.

Embodiment 12

Figure 12:
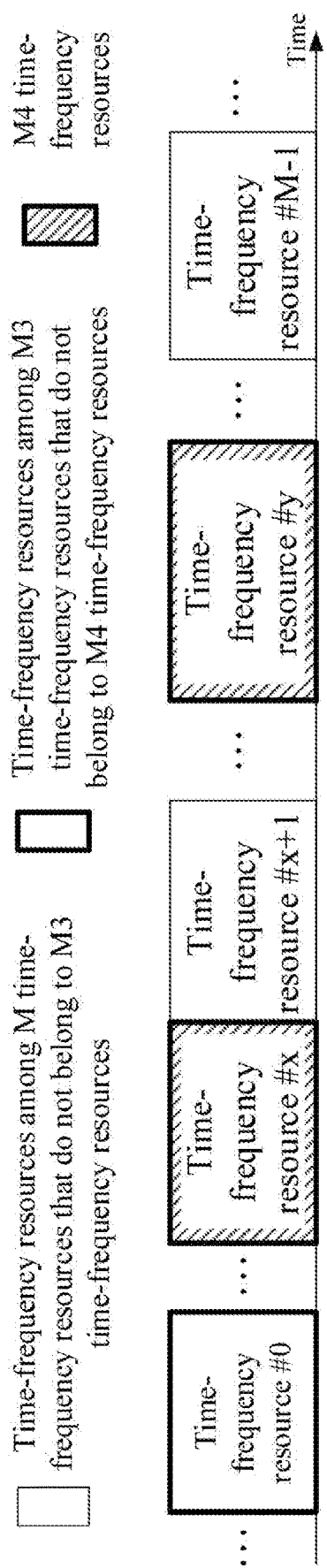
FIG. 12 is a diagram illustrating a relationship between M time-frequency resources and M3 time-frequency resource(s) in a time domain according to one embodiment of the present disclosure.

Embodiment 12 illustrates an example of a diagram of a relationship between M time-frequency resources and M3 time-frequency resource(s) in a time domain, as shown in FIG. 12.

In Embodiment 12, the M time-frequency resources are reserved to the first radio signal in the present disclosure, and the base station in the present disclosure determines that it is only needed to receive the first radio signal in M1 time-frequency resource(s) among the M time-frequency resources. The first radio signal includes a first reference signal, and the base station monitors the first reference signal in M3 time-frequency resource(s) and detects the first reference signal in M4 time-frequency resource(s). Herein, the M3 time-frequency resource(s) is(are) a subset of the M time-frequency resources, the M4 time-frequency resource(s) is(are) a subset of the M3 time-frequency resource(s), the M3 is a positive integer not greater than the M, and the M4 is a positive integer not greater than the M3.

In FIG. 12, blank boxes having fine line frames represent time-frequency resources among the M time-frequency resources that do not belong to the M3 time-frequency resource(s), a blank box having a heavy line frame represents a time-frequency resource among the M3 time-frequency resources that do not belong to the M4 time-frequency resource(s), and boxes having heavy line frames and filled by left slashes represent the M4 time-frequency resource(s). The M time-frequency resources are represented by {a time-frequency resource #0, a time-frequency resource #x, . . . , a time-frequency resource #y, . . . , a time-frequency resource #M−1} respectively, wherein the x and the y are positive integers less than the M−1 respectively, and the y is greater than the x plus 1.

In one embodiment, at least two adjacent time-frequency resources among the M3 time-frequency resources are at inconsecutive positions in the M time-frequency resources.

In one embodiment, the M4 is greater than 1, and at least two adjacent time-frequency resources among the M4 time-frequency resources are at inconsecutive positions in the M time-frequency resources.

In one embodiment, a time-frequency resource #A and a time-frequency resource #B are two time-frequency resources among the M3 time-frequency resource(s) respectively, positions of the time-frequency resource #A and the time-frequency resource #B in the M3 time-frequency resources are consecutive, positions of the time-frequency resource #A and the time-frequency resource #B in the M time-frequency resources are inconsecutive, the A and the B are positive integers less than the M respectively, and the B is greater than the A. At least two adjacent time-frequency resources among {all time-frequency resources among the M time-frequency resources that are located between the time-frequency resource #A and the time-frequency resource #B, the time-frequency resource #B} are inconsecutive in the time domain.

In one subembodiment, in FIG. 12, a time-frequency resource #x and a time-frequency resource #y are two time-frequency resources among the M3 time-frequency resources respectively, positions of the time-frequency resource #x and the time-frequency resource #y in the M3 time-frequency resources are consecutive, positions of the time-frequency resource #x and the time-frequency resource #y in the M time-frequency resources are inconsecutive, and at least two adjacent time-frequency resources among {a time-frequency resource #x+1, a time-frequency resource #x+2, a time-frequency resource #y} are inconsecutive in the time domain.

In one subembodiment, if the base station detects the first reference signal in the time-frequency resource #A, the base station determines that it is needed to receive the first radio signal in the time-frequency resource #A.

In one subembodiment, if the base station detects the first reference signal in the time-frequency resource #A, the base station determines that it is needed to receive the first radio signal in all time-frequency resources among the M time-frequency resources that are located behind the time-frequency resource #A in the time domain and are continuous with the time-frequency resource #A in the time domain. For example, if the base station detects the first reference signal in the time-frequency resource #x shown in FIG. 12, the base station determines that it is needed to receive the first radio signal in the time-frequency resource #x+1.

In one subembodiment, if the base station detects the first reference signal in the time-frequency resource #A, the base station determines that it is needed to receive the first radio signal in all time-frequency resources among the M time-frequency resources that are located before the time-frequency resource #A in the time domain and have time intervals to the time-frequency resource #A less than a third threshold.

In one embodiment, for any given time-frequency resource among the M4 time-frequency resource(s), if a positive integer number of time-frequency resource(s) among the M time-frequency resources is(are) located behind the given time-frequency resource, meanwhile the given time-frequency resource and the positive integer number of time-frequency resource(s) are consecutive in the time domain, the base station determines that it is needed to receive the first radio signal in the positive integer number of time-frequency resource(s).

Embodiment 13

Figure 13:
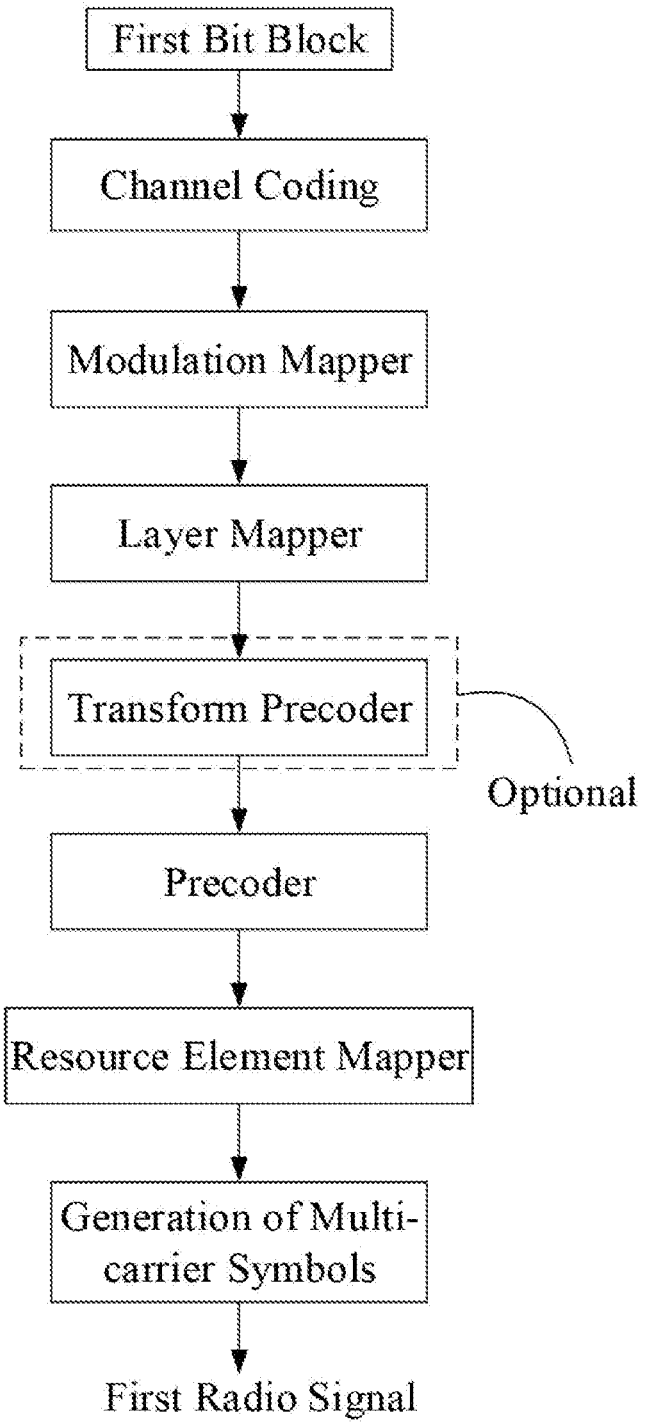
FIG. 13 is a diagram illustrating the generation of a first radio signal according to one embodiment of the present disclosure.

Embodiment 13 illustrates an example of a diagram of the generation of a first radio signal, as shown in FIG. 13.

In Embodiment 13, the first radio signal carries a first bit block, and the first bit block includes a positive integer number of bits. The first radio signal is an output after the first bit block experiences in sequence channel coding, modulation mapper, layer mapper, transform precoder (used for generating complex-value signals), precoding, resource element mapper, and generation of wideband symbols. The operation in the dashline box is optional.

In one embodiment, the phrase that a given radio signal carrying a given bit block refers that: the given radio signal is an output after the given bit block experiences in sequence channel coding, modulation mapper, layer mapper, precoding, resource element mapper, and generation of wideband symbols.

In one embodiment, the phrase that a given radio signal carrying a given bit block refers that: the given radio signal is an output after the given bit block experiences in sequence channel coding, modulation mapper, layer mapper, transform precoder, precoding, resource element mapper, and generation of wideband symbols.

In one embodiment, the phrase that a given radio signal carrying a given bit block refers that: the given bit block is used for generating the given radio signal.

In one embodiment, a reception value of the first radio signal is used by the base station in the present disclosure to recover the first bit block.

In one embodiment, a reception value of the first radio signal experiences in sequence Discrete Fourier Transform (DFT), multi-antenna detection, constellation demodulation and channel decoding to recover the first bit block.

In one embodiment, a reception value of the first radio signal experiences in sequence DFT, equalization, multi-antenna detection, constellation demodulation and channel decoding to recover the first bit block.

In one embodiment, a reception value of the first radio signal experiences in sequence one or more of {DFT, equalization, multi-antenna detection, constellation demodulation, channel decoding} to recover the first bit block.

Embodiment 14

Figure 14:
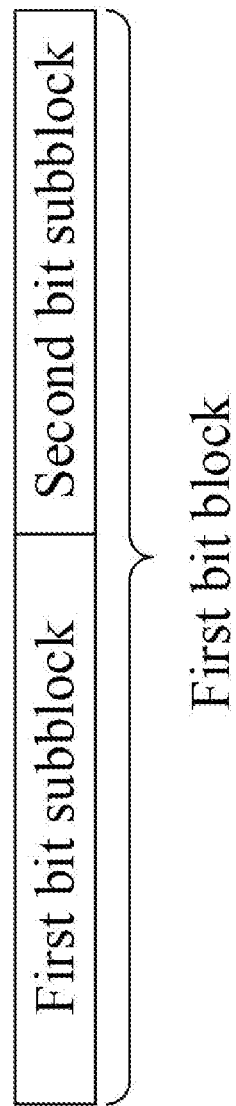
FIG. 14 is a diagram illustrating a first bit block according to one embodiment of the present disclosure.

Embodiment 14 illustrates an example of a diagram of a first bit block, as shown in FIG. 14.

In Embodiment 14, the M time-frequency resources in the present disclosure are reserved to the first radio signal; the UE in the present disclosure determines that the first radio signal can be transmitted in only M1 time-frequency resource(s) among the M time-frequency resources on the first frequency subband; the first radio signal carries a first bit block, and the number of bits contained in the first bit block is related to the M1. The first bit block includes a first bit subblock and a second bit subblock, and the second bit subblock is generated by a CRC bit block of the first bit subblock.

In one embodiment, the first bit block includes a first bit subblock and a second bit subblock, and the second bit subblock is generated by a CRC bit block of the first bit subblock.

In one embodiment, the first bit block consists of a first bit subblock and a second bit subblock, and the second bit subblock is generated by a CRC bit block of the first bit subblock.

In one embodiment, the first bit subblock includes a positive integer number of bits.

In one embodiment, the second bit subblock includes a positive integer number of bits.

In one embodiment, bits in the first bit block are arranged in sequence.

In one embodiment, bits in the first bit subblock are arranged in sequence.

In one embodiment, bits in the second bit subblock are arranged in sequence.

In one embodiment, the first bit block includes uplink data.

In one embodiment, the first bit block includes a Transport Block (TB), and the TB includes a positive integer number of bits.

In one embodiment, the number of bits contained in the first bit block is a Transport Block Size (TBS).

In one embodiment, the first bit block includes a UCI.

In one embodiment, the first bit block includes a HARQ-ACK.

In one embodiment, the first bit block includes an SR.

In one embodiment, the first bit block includes a CRI.

In one embodiment, the first bit block includes a CSI.

In one subembodiment, the CSI includes one or more of a CRI, a PMI, an RSRP, an RSRQ and a CQI.

In one embodiment, a ratio of the number of bits contained in the first bit block to a number of REs occupied by the first radio signal is unrelated to the M1.

In one embodiment, for different values of the M1, an absolute value of a difference between a ratio of the number of bits contained in the first bit block to a number of REs occupied by the first radio signal and a reference ratio is not greater than a first threshold.

In one embodiment, a ratio of a number of bits contained in the first bit subblock to a number of REs occupied by the first radio signal is unrelated to the M1.

In one embodiment, for different values of the M1, an absolute value of a difference between a ratio of a number of bits contained in the first bit subblock to a number of REs occupied by the first radio signal and a reference ratio is not greater than a first threshold.

In one embodiment, the first bit subblock includes one TB, and the TB contains a positive integer number of bits.

In one embodiment, a number of bits contained in the first bit subblock is a TBS.

In one embodiment, the reference ratio is a positive real number.

In one embodiment, the first threshold is a non-negative real number.

In one embodiment, the first threshold is equal to 0.

In one embodiment, the first threshold is greater than 0.

In one embodiment, the reference ratio is configured by a high-layer signaling.

In one embodiment, the first threshold is configured by a high-layer signaling.

In one embodiment, the first threshold is default (no configuration is required).

In one embodiment, the first signaling in the present disclosure is used for determining at least one of the reference ratio and the first threshold.

In one embodiment, the downlink information in the present disclosure is used for determining at least one of the reference ratio and the first threshold.

In one embodiment, the number of bits contained in the first bit block decreases with the decrease of the M1.

In one embodiment, when the M1 is equal to A1, the number of bits contained in the first bit block is equal to C1; when the M1 is equal to A2, the number of bits contained in the first bit block is equal to C2; the A1, the C1, the A2 and the C2 are positive integers respectively; the A1 is greater than the A2, and the C1 is not less than the C2.

In one subembodiment, the C1 is greater than the C2.

In one subembodiment, the C1 is equal to the C2.

In one embodiment, a number of bits contained in the first bit subblock decreases with the decrease of the M1.

In one embodiment, when the M1 is equal to A1, the number of bits contained in the first bit subblock is equal to C3; when the M1 is equal to A2, the number of bits contained in the first bit subblock is equal to C4; the A1, the C3, the A2 and the C4 are positive integers respectively; the A1 is greater than the A2, and the C3 is not less than the C4.

In one subembodiment, the C3 is greater than the C4.

In one subembodiment, the C3 is equal to the C4.

Embodiment 15

Figure 15:
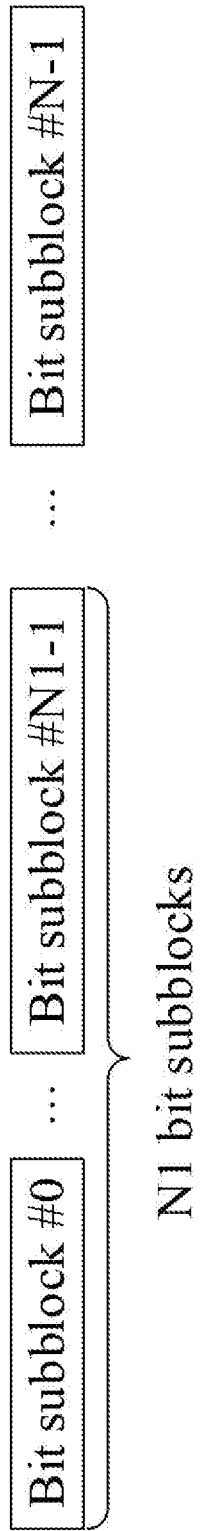
FIG. 15 is a diagram illustrating N bit subblocks and N1 bit subblock(s) according to one embodiment of the present disclosure.

Embodiment 15 illustrates an example of a diagram of N bit subblocks and N1 bit subblock(s), as shown in FIG. 15.

In Embodiment 15, the first bit block in the present disclosure includes the N1 bit subblock(s) among the N bit subblocks, the N is a positive integer, the N1 is a positive integer not greater than the N, and the N1 is related to the M1 in the present disclosure. In FIG. 15, the N bit subblocks are represented by {a bit subblock #0, . . . , a bit subblock #N−1} respectively.

In one embodiment, any of the N bit subblocks contains a positive integer number of bits.

In one embodiment, bits in any of the N bit subblocks are arranged in sequence.

In one embodiment, the N bit subblocks are arranged in sequence.

In one embodiment, the N is greater than 1.

In one embodiment, the N1 is equal to the N.

In one embodiment, the N1 is less than the N.

In one embodiment, the phrase that the N1 is related to the M1 refers that: the value of the N1 is related to the value of the M1.

In one embodiment, the phrase that the N1 is related to the M1 refers that: the value of the M1 is used for determining the value of the N1.

In one embodiment, the phrase that the N1 is related to the M1 refers that: the UE in the present disclosure determines the value of the N1 according to the value of the M1.

In one embodiment, the N1 decreases with the decrease of the M1.

In one embodiment, when the M1 is equal to A1, the N1 is equal to B1; when the M1 is equal to A2, the N1 is equal to B2; the A1, the B1, the A2 and the B2 are positive integers respectively; the A1 is greater than the A2, and the B1 is not less than the B2.

In one subembodiment, the B1 is greater than the B2.

In one subembodiment, the B1 is equal to the B2.

In one embodiment, the first bit block consists of the N1 bit subblock(s).

In one embodiment, a given bit subblock includes a given information bit subblock and a given check bit subblock, and the given check bit subblock is generated by a CRC bit block of the given information bit subblock; the given bit subblock is any of N2 bit subblock(s), the N2 bit subblock(s) is(are) a subset of the N bit subblocks, and the N2 is non-negative integer not greater than the N.

In one subembodiment, the N2 is equal to N.

In one subembodiment, the N2 is less than N.

In one subembodiment, the N2 is equal to 0.

In one subembodiment, the N2 is greater than 0.

In one subembodiment, bits in the given information bit subblock are arranged in sequence.

In one subembodiment, bits in the given check bit subblock are arranged in sequence.

In one embodiment, for given N and N1, the position(s) of the N1 bit subblock(s) in the N bit subblocks is(are) preconfigured.

In one embodiment, for given N and N1, the position(s) of the N1 bit subblock(s) in the N bit subblocks is(are) configured by a high-layer signaling.

In one embodiment, for given N and N1, the position(s) of the N1 bit subblock(s) in the N bit subblocks is(are) default (no configuration is required).

In one embodiment, the positions of the N1 bit subblocks in the N bit subblocks are consecutive.

In one embodiment, the N1 bit subblock(s) is(are) N1 bit subblock(s) with (a) smallest index(es) among the N bit subblocks.

In one subembodiment, the N1 bit subblock(s) consist(s) of a bit subblock #0 to a bit subblock #N1−1.

In one embodiment, the N1 bit subblock(s) is(are) N1 bit subblock(s) arranged in forefront among the N bit subblocks.

Embodiment 16

Figure 16:
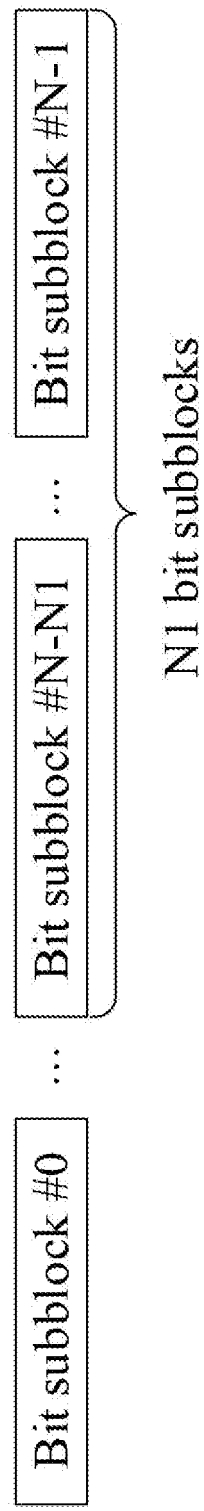
FIG. 16 is a diagram illustrating N bit subblocks and N1 bit subblock(s) according to one embodiment of the present disclosure.

Embodiment 16 illustrates an example of a diagram of N bit subblocks and N1 bit subblock(s), as shown in FIG. 16.

In Embodiment 16, the first bit block in the present disclosure includes the N1 bit subblock(s) among the N bit subblocks, the N is a positive integer, the N1 is a positive integer not greater than the N, and the N1 is related to the M1 in the present disclosure. In FIG. 16, the N bit subblocks are represented by {a bit subblock #0, . . . , a bit subblock #N−1} respectively.

In one embodiment, the N1 bit subblock(s) is(are) N1 bit subblock(s) with (a) greatest index(es) among the N bit subblocks.

In one subembodiment, the N1 bit subblock(s) consist(s) of a bit subblock #N−N1 to a bit subblock #N−1.

In one embodiment, the N1 bit subblock(s) is(are) N1 bit subblock(s) arranged in rearmost among the N bit subblocks.

Embodiment 17

Figure 17:
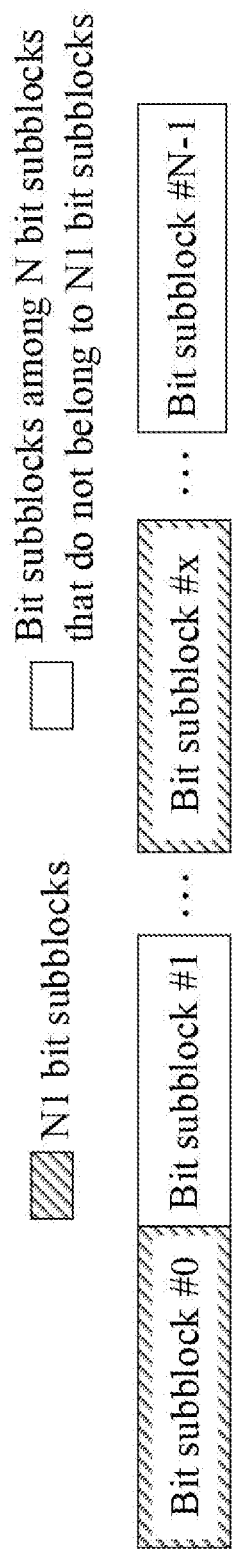
FIG. 17 is a diagram illustrating N bit subblocks and N1 bit subblock(s) according to one embodiment of the present disclosure.

Embodiment 17 illustrates an example of a diagram of N bit subblocks and N1 bit subblock(s), as shown in FIG. 17.

In Embodiment 17, the first bit block in the present disclosure includes the N1 bit subblock(s) among the N bit subblocks, the N is a positive integer, the N1 is a positive integer not greater than the N, and the N1 is related to the M1 in the present disclosure. In FIG. 17, the N bit subblocks are represented by {a bit subblock #0, a bit subblock #1, . . . , a bit subblock #x, . . . , a bit subblock #N−1} respectively, wherein the x is positive integer less than the N−1. Blank boxes represent bit subblocks among the N bit subblocks that do not belong to the N1 bit subblock(s), and boxes filled by left slashes represent the N1 bit subblock(s).

In one embodiment, at least two adjacent bit subblocks among the N1 bit subblocks are at inconsecutive positions in the N bit subblocks.

Embodiment 18

Figure 18:
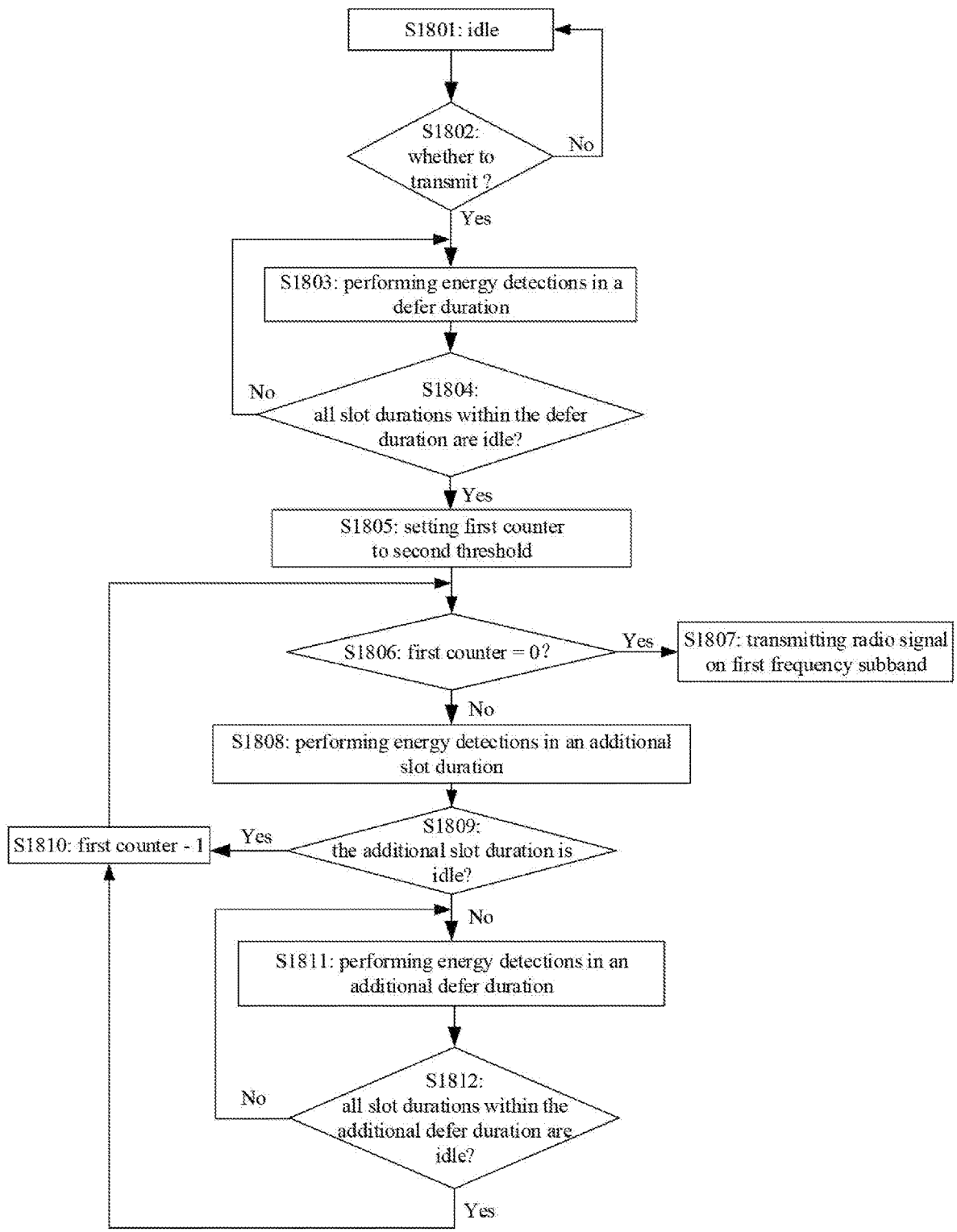
FIG. 18 is a diagram illustrating a given access detection according to one embodiment of the present disclosure.

Embodiment 18 illustrates an example of a diagram of a given access detection, as shown in FIG. 18.

In Embodiment 18, the given access detection is any of the M2 time(s) of access detection(s) in the present disclosure. The M2 time(s) of access detection(s) is(are) performed in the M2 time window(s) on the first frequency subband in the present disclosure respectively. The given access detection includes performing Q times of energy detections in Q time subpools in a given time window respectively to obtain Q detection values, wherein the given time window is one of the M2 time window(s) that is corresponding to the given access detection, Q1 detection value(s) among the Q detection values is(are) each less than a first threshold, the Q is a positive integer, and the Q1 is a non-negative integer not greater than the Q. Q1 time subpool(s) is(are) (a) time subpool(s) among the Q time subpools that is(are) corresponding to the Q1 detection value(s) respectively. The process of the Q times of energy detections is described by the flowchart in FIG. 18.

In FIG. 18, the UE in the present disclosure is in an idle state in S1801; determines whether it is needed to transmit signals in S1802; performs energy detections in a defer duration in S1803; determines whether all slot durations within the defer duration are idle in S1804, if yes, goes to S1805 to set a first counter to a second threshold, otherwise, returns to S1804; determines whether the first counter is 0 in S1806, if yes, goes to S1807 to transmit a radio signal on the first frequency subband in the present disclosure, otherwise, goes to S1808 to perform energy detections in an additional slot duration; determines whether the additional slot duration is idle in S1809, if yes, goes to step S1810 to subtract 1 from the first counter, and then returns to S1806, otherwise, goes to S1811 to perform energy detections in an additional defer duration; determines whether all slot durations within the additional defer duration are idle in S1812, if yes, goes to S1810, otherwise, returns to S1811. The second threshold is one of K candidate integers, and the K is a positive integer.

In Embodiment 18, a first given duration includes a positive integer number of subpools among the Q time subpools, and the first given duration is any one duration among {all defer durations, all additional slot durations, all additional defer durations} included in FIG. 18 that is located within the given time window in a time domain. A second given duration includes 1 time subpool among the Q1 time subpools, and the second given duration is any one duration among {all additional slot durations, all additional defer durations} determined to be idle through energy detections in FIG. 18 that is located within the given time window in the time domain.

In one embodiment, {all defer durations, all additional slot durations, all additional defer durations} included in FIG. 18 are all located within the given time window in the time domain.

In one embodiment, if the value of the first counter is not equal to 0 yet when the given time window ends, the process of the given access detection shown in FIG. 18 is terminated.

In one embodiment, if the first counter is equal to 0 before the given time window ends, the given access detection determines that the first frequency subband is idle, otherwise, the given access detection determines that the first frequency subband is non-idle.

In one embodiment, any slot duration within a given duration includes 1 of the Q time subpools; the given duration is any one duration among {all defer durations, all additional slot durations, all additional defer durations} included in FIG. 18 that is located within the given time window in the time domain.

In one embodiment, the phrase that performs energy detections in a given duration refers to: performing energy detections in all slot durations within the given duration, wherein the given duration is any one duration among {all defer durations, all additional slot durations, all additional defer durations} included in FIG. 18.

In one embodiment, the phrase that a given duration determined to be idle through energy detections refers that: all slot durations included in the given duration are determined to be idle through energy detections, wherein the given duration is any one duration among {all defer durations, all additional slot durations, all additional defer durations} included in FIG. 18.

In one embodiment, the phrase that a given slot duration determined to be idle through energy detections refers that: the UE senses powers of all radio signals on the first frequency subband in a given time unit and averages the powers over time, and the obtained reception power is lower than a first threshold, wherein the given time unit is a continuous period of time in the given slot duration.

In one subembodiment, a duration of the given time unit is not less than 4 microseconds.

In one embodiment, the phrase that a given slot duration determined to be idle through energy detections refers that: the UE senses energies of all radio signals on the first frequency subband in a given time unit and averages the energies over time, and the obtained reception energy is lower than a first threshold, wherein the given time unit is a continuous period of time in the given slot duration.

In one subembodiment, a duration of the given time unit is not less than 4 microseconds.

In one embodiment, the phrase that a given slot duration determined to be idle through energy detections refers that: the UE performs energy detections in the time subpool included in the given slot duration, and the obtained detection value is less than a first threshold, wherein the time subpool belongs to the Q time subpools, and the detection value belong to the Q detection values.

In one embodiment, the phrase that performs energy detections in a given duration refers to: performing energy detections in all time subpools within the given duration, wherein the given duration is any one duration among {all defer durations, all additional slot durations, all additional defer durations} included in FIG. 18, and the all time subpools belong to the Q time subpools.

In one embodiment, the phrase that a given duration determined to be idle through energy detections refers that: energy detections are performed in all time subpools included in the given duration and all obtained detection values are less than a first threshold, wherein the given duration is any one duration among {all defer durations, all additional slot durations, all additional defer durations} included in FIG. 18, the all time subpools belong to the Q time subpools, and the detection values belong to the Q detection values.

In one embodiment, one defer duration is 16 microseconds plus S1*9 microseconds, wherein the S1 is a positive integer.

In one subembodiment, one defer duration includes S1+1 time subpools among the Q time subpools.

In one reference embodiment of the above subembodiment, a duration of the first time subpool among the S1+1 time subpools is not greater than 16 microseconds, and (a) duration(s) of other S1 time subpool(s) is(are) each not greater than 9 microseconds.

In one subembodiment, the S1 belongs to {1, 2, 3, 7}.

In one embodiment, one defer duration includes a plurality of slot durations.

In one subembodiment, a first slot duration and a second slot duration among the plurality of slot durations are inconsecutive.

In one subembodiment, a first slot duration and a second slot duration among the plurality of slot durations have a time interval of 7 ms.

In one embodiment, one additional defer duration is 16 microseconds plus S2*9 microseconds, wherein the S2 is a positive integer.

In one subembodiment, one additional defer duration includes S2+1 time subpools among the Q time subpools.

In one reference embodiment of the above subembodiment, a duration of the first time subpool among the S2+1 time subpools is not greater than 16 microseconds, and (a) duration(s) of other S2 time subpool(s) is(are) each not greater than 9 microseconds.

In one subembodiment, the S2 belongs to {1, 2, 3, 7}.

In one embodiment, one defer duration is equal to one additional defer duration.

In one embodiment, the S1 is equal to the S2.

In one embodiment, one additional defer duration includes a plurality of slot durations.

In one subembodiment, a first slot duration and a second slot duration among the plurality of slot durations are inconsecutive.

In one subembodiment, a first slot duration and a second slot duration among the plurality of slot durations have a time interval of 7 ms.

In one embodiment, one slot duration is 9 microseconds.

In one embodiment, one slot duration includes 1 time subpool among the Q time subpools.

In one subembodiment, a duration of the 1 time subpool is not greater than 9 microseconds.

In one embodiment, one additional slot duration is 9 microseconds.

In one embodiment, one additional slot duration includes 1 time subpool among the Q time subpools.

In one subembodiment, a duration of the 1 time subpool is not greater than 9 microseconds.

In one embodiment, the K belongs to {3,7,15,31,63,127, 255,511,1023}.

In one embodiment, the K is a $CW_p$ during LBT of Cat 4, the $CW_p$ represents Contention Window, and the specific definition of the $CW_p$ can refer to Chapter 15 in 3GPP TS36.213.

In one embodiment, the K candidate integers are 0, 1, 2, . . . , K−1.

In one embodiment, the UE selects the second threshold from the K candidate integers randomly.

In one embodiment, any of the K candidate integers has a same probability to be selected as the second threshold.

In one embodiment, the Q times of energy detections refer to energy detections in LBT, and the specific definition and implementation of LBT can refer to 3GPP TR36.889.

In one embodiment, the Q times of energy detections refer to energy detections in a Clear Channel Assessment (CCA), and the specific definition and implementation of the CCA can refer to 3GPP TR36.889.

In one embodiment, any of the Q times of energy detections is implemented through the approach defined in Chapter 15 in 3GPP TS36.213.

In one embodiment, any of the Q times of energy detections is implemented through the energy detection approach in WiFi.

In one embodiment, any of the Q times of energy detections is implemented through a measurement of Received Signal Strength Indication (RSSI).

In one embodiment, any of the Q times of energy detections is implemented through the energy detection approach in LTE LAA.

In one embodiment, any of the Q time subpools occupies consecutive time domain resources.

In one embodiment, the Q time subpools are orthogonal (non-overlapping) to one another in the time domain.

In one embodiment, a duration of any of the Q time subpools is one of {16 microseconds, 9 microseconds}.

In one embodiment, at least two time subpools among the Q time subpools have different durations of time.

In one embodiment, any two time subpools among the Q time subpools have a same duration of time.

In one embodiment, time domain resources occupied by the Q time subpools are consecutive.

In one embodiment, at least two adjacent time subpools among the Q time subpools occupy inconsecutive time domain resources.

In one embodiment, any two adjacent time subpools among the Q time subpools occupy inconsecutive time domain resources.

In one embodiment, any of the Q time subpools is a slot duration.

In one embodiment, any of the Q time subpools is $T_{sl}$, the $T_{sl}$ is a slot duration, and the specific definition of the $T_{sl}$ can refer to Chapter 15 in 3GPP TS36.213.

In one embodiment, any of the Q time subpools other than an earliest time subpool is a slot duration.

In one embodiment, any of the Q time subpools other than an earliest time subpool is $T_{sl}$, the $T_{sl}$ is a slot duration, and the specific definition of the $T_{sl}$ can refer to Chapter 15 in 3GPP TS36.213.

In one embodiment, the Q time subpools include at least one time subpool with a duration of 16 microseconds.

In one embodiment, the Q time subpools include at least one time subpool with a duration of 9 microseconds.

In one embodiment, an earliest one of the Q time subpools has a duration of 16 microseconds.

In one embodiment, a last one of the Q time subpools has a duration of 9 microseconds.

In one embodiment, the Q time subpools include listening time in Cat4 (Type 4) LBT.

In one embodiment, the Q time subpools include slot durations in defer durations and slot durations in backoff time in Cat4 (Type 4) LBT.

In one embodiment, the Q time subpools include slot durations in defer durations and slot durations in backoff time in a Type 1 UL channel access procedure.

In one embodiment, the Q time subpools include slot durations in an initial CCA and an Enhanced Clear Channel Assessment (eCCA).

In one embodiment, the Q times of energy detections obtain the Q detection values respectively.

In one embodiment, the Q detection values are reception powers obtained after the UE senses powers of all radio signals on the first frequency subband and average the powers over time in Q time units respectively, wherein the Q time units are continuous periods of time in the Q time subpools respectively.

In one subembodiment, a duration of any of the Q time units is not less than 4 microseconds.

In one embodiment, the Q detection values are reception energies obtained after the UE senses energies of all radio signals on the first frequency subband and average the energies over time in Q time units respectively, wherein the Q time units are continuous periods of time in the Q time subpools respectively.

In one subembodiment, the duration of any of the Q time units is not less than 4 microseconds.

In one embodiment, any given energy detection among the Q times of energy detections refers that: the UE monitors reception powers in a given time unit, wherein the given time unit is a continuous period of time in one of the Q time subpools that is corresponding to the given energy detection.

In one embodiment, any given energy detection among the Q times of energy detections refers that: the UE monitors reception energies in a given time unit, wherein the given time unit is a continuous period of time in one of the Q time subpools that is corresponding to the given energy detection.

In one embodiment, the Q times of energy detections are used for determining whether the first frequency subband is idle.

In one embodiment, the Q times of energy detections are used for determining whether the first frequency subband can be used by a given node to transmit a radio signal.

In one embodiment, the Q detection values are in units of dBm.

In one embodiment, the Q detection values are in units of mW.

In one embodiment, the Q detection values are in units of J (Joule).

In one embodiment, the Q1 is less than the Q.

In one embodiment, the Q1 is equal to 0.

In one embodiment, the Q1 is greater than 0.

In one embodiment, the Q is greater than 1.

In one embodiment, the first threshold is in units of dBm.

In one embodiment, the first threshold is in units of mW.

In one embodiment, the first threshold is in units of Joule.

In one embodiment, the first threshold is equal to or less than −72 dBm.

In one embodiment, the first threshold is any value equal to or less than a first given value.

In one subembodiment, the first given value is predefined.

In one subembodiment, the first given value is configured by a high-layer signaling.

In one embodiment, the first threshold is selected by the UE freely that is equal to or less than a first given value.

In one subembodiment, the first given value is predefined.

In one subembodiment, the first given value is configured by a high-layer signaling.

In one embodiment, the Q1 is equal to the second threshold, and one of the M2 time-frequency resource(s) that is corresponding to the given access detection can be used to transmit the first radio signal in the present disclosure.

In one embodiment, the Q1 is less than the second threshold, and one of the M2 time-frequency resource(s) that is corresponding to the given access detection cannot be used to transmit the first radio signal in the present disclosure.

In one embodiment, detection values among the Q detections values that do not belong to the Q1 detection value(s) include at least one detection value that is less than the first threshold value.

In one embodiment, detection values among the Q detections values that do not belong to the Q1 detection value(s) include at least one detection value that is not less than the first threshold value.

In one embodiment, the Q1 time subpool(s) include(s) slot durations in an eCCA only.

In one embodiment, the Q time subpools include the Q1 time subpool(s) and Q2 time subpool(s); any of the Q2 time subpool(s) does not belong to the Q1 time subpool(s); and the Q2 is a positive integer not greater than the Q minus the Q1.

In one subembodiment, the Q2 time subpool(s) include(s) slot durations in an initial CCA.

In one subembodiment, positions of the Q2 time subpools in the Q time subpools are consecutive.

In one subembodiment, at least one of the Q2 time subpool(s) has a corresponding detection value less than the first threshold.

In one subembodiment, at least one of the Q2 time subpool(s) has a corresponding detection value not less than the first threshold.

In one subembodiment, the Q2 time subpool(s) include(s) all slot durations within all defer durations that are located within the given time window in the time domain.

In one subembodiment, the Q2 time subpool(s) include(s) all slot durations within at least one additional defer duration.

In one subembodiment, the Q2 time subpool(s) include(s) at least one additional slot duration.

In one subembodiment, the Q2 time subpool(s) include(s) all slot durations within all additional slot durations and all additional defer durations that are determined to be non-idle through energy detections in FIG. 18 and are located in the given time window in the time domain.

In one embodiment, the Q1 time subpool(s) belong(s) to Q1 subpool set(s) respectively, and any of the Q1 subpool set(s) includes a positive integer number of time subpool(s) among the Q time subpools; any of the Q1 subpool set(s) has a corresponding detection value less than the first threshold value.

In one subembodiment, at least one subpool set among the Q1 subpool set(s) includes 1 time subpool.

In one subembodiment, at least one subpool set among the Q1 subpool set(s) includes more than 1 time subpool.

In one subembodiment, at least two subpool sets among the Q1 subpool set(s) include different numbers of time subpools.

In one subembodiment, none of the Q time subpools belongs to two subpools sets of the Q1 subpool sets simultaneously.

In one subembodiment, all time subpools in any of the Q1 subpool set(s) belong to one same additional defer duration or additional slot duration determined to be idle through energy detection.

In one subembodiment, time subpools among the Q time subpools that do not belong to the Q1 subpool set(s) include at least one time subpool which has a corresponding detection value less than the first threshold.

In one subembodiment, time subpools among the Q time subpools that do not belong to the Q1 subpool set(s) include at least one time subpool which has a corresponding detection value not less than the first threshold.

In one embodiment, the given access detection is an uplink access detection.

In one embodiment, the given access detection is Cat4 LBT (Type 4 LBT), and the specific definition of the Cat4 LBT can refer to 3GPP TR36.889.

In one embodiment, the given access detection is a Type 1 UL channel access procedure, and the specific definition of the Type 1 UL channel access procedure can refer to Chapter 15.2 in 3GPP TS36.213.

In one embodiment, the given access detection is implemented by the approaches defined in Chapter 15.2 in 3GPP TS36.213 respectively.

In one embodiment, at least two of the M2 times of access detections include different numbers of times of energy detections.

Embodiment 19

Figure 19:
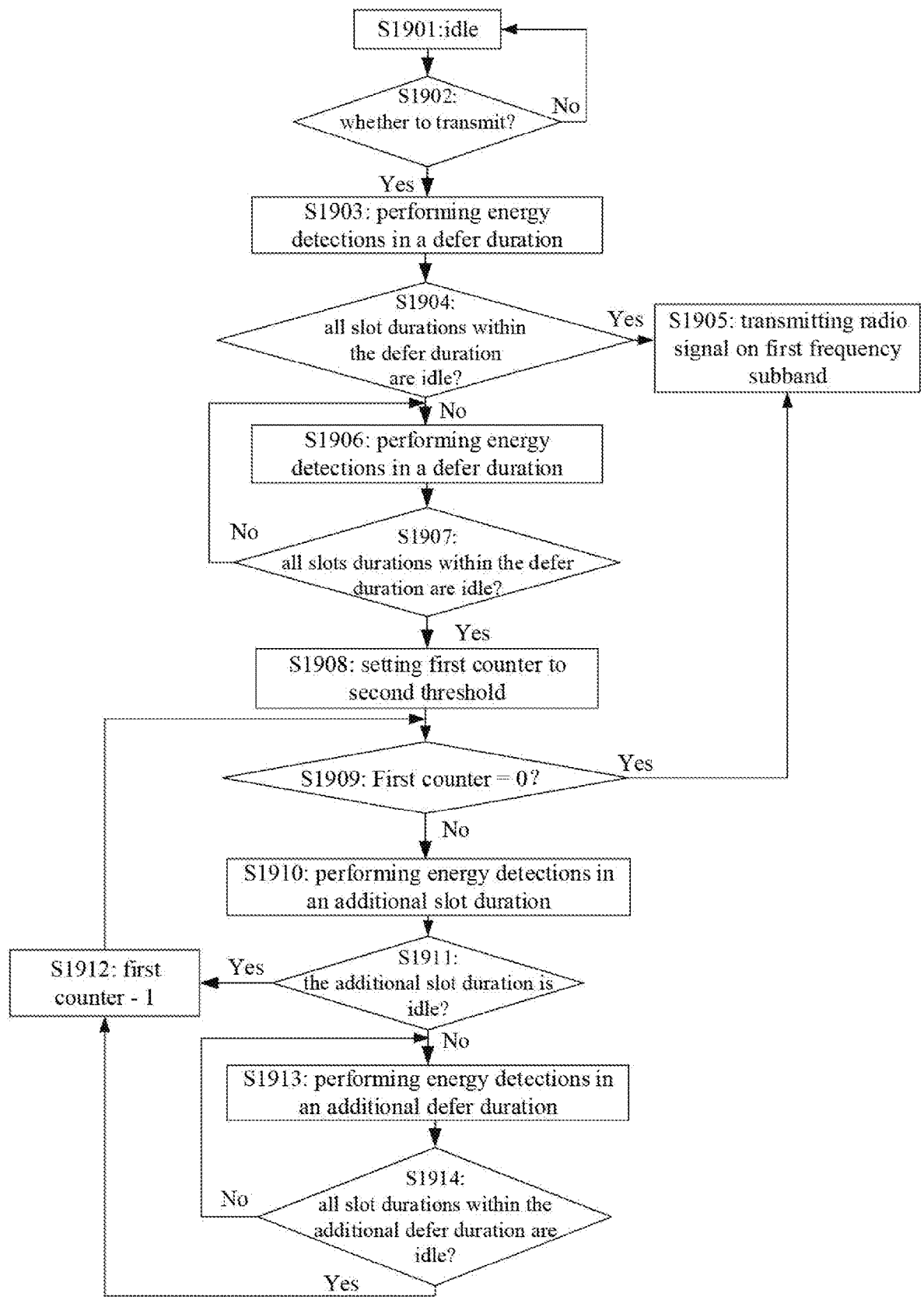
FIG. 19 is a diagram illustrating a given access detection according to one embodiment of the present disclosure.

Embodiment 19 illustrates an example of a diagram of a given access detection, as shown in FIG. 19.

In Embodiment 19, the given access detection is any of the M2 time(s) of access detection(s) in the present disclosure. The M2 time(s) of access detection(s) is(are) performed in the M2 time window(s) on the first frequency subband in the present disclosure respectively. The given access detection includes performing Q times of energy detections in Q time subpools in a given time window respectively to obtain Q detection values, wherein the given time window is a time window among the M2 time window(s) that is corresponding to the given access detection, Q1 detection value(s) among the Q detection values is(are) each less than a first threshold, the Q is a positive integer, and the Q1 is a non-negative integer not greater than the Q. Q1 time subpool(s) is(are) (a) time subpool(s) among the Q time subpools that is(are) corresponding to the Q1 detection value(s) respectively. The process of the Q times of energy detections is described by the flowchart in FIG. 19.

In Embodiment 19, the UE in the present disclosure is in an idle state in S1901; determines whether it is needed to transmit signals in S1902; performs energy detections in a defer duration in S1903; determines whether all slot durations within the defer duration are idle in S1904, if yes, goes to S1905 to transmit a radio signal on the first frequency subband, otherwise, goes to S1906 to perform energy detections in a defer duration; determines whether all slot durations within the defer duration are idle in S1907, if yes, goes to S1908 to set a first counter to a second threshold, otherwise, returns to S1906; determines whether the first counter is 0 in S1909, if yes, goes to S1905 to transmit a radio signal on the first frequency subband, otherwise, goes to S1910 to perform energy detections in an additional slot duration; determines whether the additional slot duration is idle in S1911, if yes, goes to step S1912 to subtract 1 from the first counter, and then returns to S1909, otherwise, goes to S1913 to perform energy detections in an additional defer duration; determines whether all slot durations within the additional defer duration are idle in S1914, if yes, goes to S1912, otherwise, returns to S1913. The second threshold is one of K candidate integers, and the K is a positive integer.

In Embodiment 19, a first given duration includes a positive integer number of subpool(s) among the Q time subpools, and the first given duration is any one duration among {all defer durations, all additional slot durations, all additional defer durations} included in FIG. 19 that is located within the given time window in a time domain. A second given duration includes 1 of the Q1 time subpools, and the second given duration is any one duration among {all additional slot durations, all additional defer durations} determined to be idle through energy detections in FIG. 19 that is located within the given time window in the time domain.

In one embodiment, {all defer durations, all additional slot durations, all additional defer durations} included in FIG. 19 are all located within the given time window in the time domain.

In one embodiment, if a value of the first counter is not equal to 0 yet when the given time window ends, the process of the given access detection shown in FIG. 19 is terminated.

In one embodiment, if all slot durations within the defer duration in S1904 are idle, one of the M2 time-frequency resource(s) that is corresponding to the given access detection can be used to transmit the first radio signal in the present disclosure.

In one embodiment, if all slot durations within the defer duration in S1904 are idle, the given access detection determines that the first frequency subband is idle.

In one embodiment, if the first counter is equal to 0 before the given time window ends, the given access detection determines that the first frequency subband is idle, otherwise, the given access detection determines that the first frequency subband is non-idle.

Embodiment 20

Figure 20:
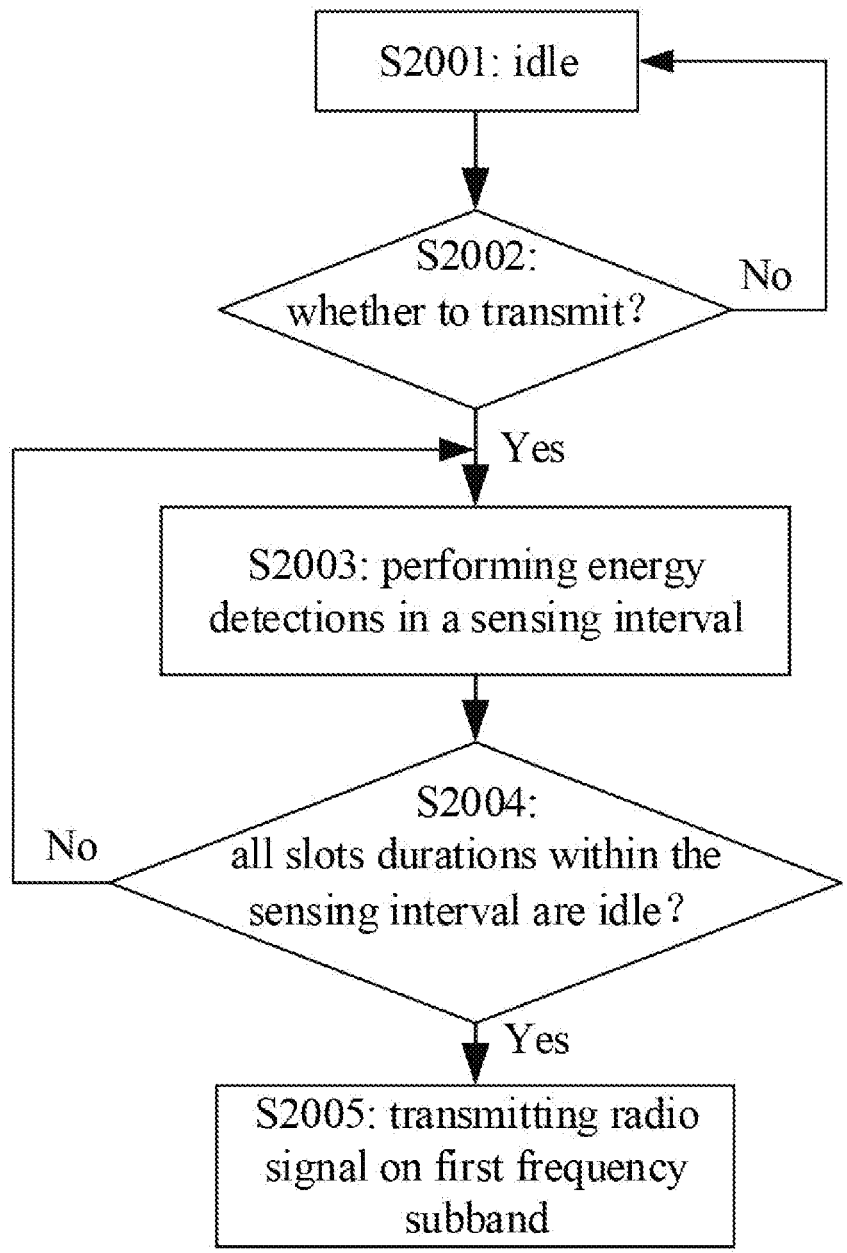
FIG. 20 is a diagram illustrating a given access detection according to one embodiment of the present disclosure.

Embodiment 20 illustrates an example of a diagram of a given access detection, as shown in FIG. 20.

In Embodiment 20, the given access detection is any of the M2 time(s) of access detection(s) in the present disclosure. The M2 time(s) of access detection(s) is(are) performed in the M2 time window(s) on the first frequency subband in the present disclosure respectively. The given access detection includes performing Q times of energy detections in Q time subpools in a given time window respectively to obtain Q detection values, wherein the given time window is one of the M2 time window(s) that is corresponding to the given access detection, Q1 detection value(s) among the Q detection values is(are) each less than a first threshold, the Q is a positive integer, and the Q1 is a non-negative integer not greater than the Q. Q1 time subpool(s) is(are) a time subpool(s) among the Q time subpools that is(are) corresponding to the Q1 detection value(s) respectively. The process of the Q times of energy detections is described by the flowchart in FIG. 20.

In Embodiment 20, the UE in the present disclosure is in an idle state in S2001; determines whether it is needed to transmit signals in S2002; performs energy detections in a sensing interval in S2003; determines whether all slot durations within the sensing interval are idle in S2004, if yes, goes to S2005 to transmit a radio signal on the first frequency subband, otherwise, returns to S2003.

In Embodiment 20, a first given duration includes a positive integer number of subpool(s) among the Q time subpools, and the first given duration is any one duration among {all sensing intervals} included in FIG. 20 that is located within the given time window in a time domain. A second given duration includes one of the Q1 time subpools, and the second given duration is a sensing interval that is determined to be idle through energy detections in FIG. 20 and is located within the given time window in the time domain.

In one embodiment, {all defer durations, all additional slot durations, all additional defer durations} included in FIG. 20 are all located within the given time window in the time domain.

In one embodiment, if all slot durations in the sensing interval in S2004 are not idle yet when the given time window ends, the process of the given access detection shown in FIG. 20 is terminated.

In one embodiment, if all slot durations in the sensing interval in S2004 are idle before the given time window ends, the given access detection determines that the first frequency subband is idle, otherwise, the given access detection determines that the first frequency subband is non-idle.

In one embodiment, the Q1 is equal to 2.
In one embodiment, the Q1 is equal to the Q.
In one embodiment, the Q1 is less than the Q.
In one embodiment, the Q1 is less than 2.
In one embodiment, the Q1 is equal to 0.
In one embodiment, one sensing interval has a duration of 25 microseconds.

In one embodiment, one sensing interval includes 2 slot durations, and the 2 slot durations are inconsecutive in the time domain.

In one subembodiment, the 2 slot durations have a time interval of 7 microseconds.

In one embodiment, the Q time subpools include listening time in Cat2 (Type 2) LBT.

In one embodiment, the Q time subpools include slots in a sensing interval in a Type 2 UL channel access procedure, and the specific definition of the sensing interval can refer to Chapter 15.2 in 3GPP TS36.213.

In one subembodiment, the sensing interval has a duration of 25 microseconds.

In one embodiment, the Q time subpools include $T_f$ and $T_{sl}$ in a sensing interval in a Type 2 UL channel access procedure, wherein the $T_f$ and the $T_{sl}$ are two time intervals, and the specific definitions of the $T_f$ and the $T_{sl}$ can refer to Chapter 15.2 in 3GPP TS36.213.

In one subembodiment, the $T_f$ has a duration of 16 microseconds.

In one subembodiment, the $T_{sl}$ has a duration of 9 microseconds.

In one embodiment, a first time subpool among the Q1 time subpools has a duration of 16 microseconds, a second time subpool among the Q1 time subpools has a duration of 9 microseconds, and the Q1 is equal to 2.

In one embodiment, the Q1 time subpools all have durations of 9 microseconds; a first time subpool and a second time subpool among the Q1 time subpools have a time interval of 7 microseconds, and the Q1 is equal to 2.

In one embodiment, the given access detection is Cat2 LBT (Type 2 LBT), and the specific definition of the Cat2 LBT can refer to 3GPP TR36.889.

In one embodiment, the given access detection is a Type 2 UL channel access procedure, and the specific definition of the Type 2 UL channel access procedure can refer to Chapter 15.2 in 3GPP TS36.213.

Embodiment 21

Figure 21:
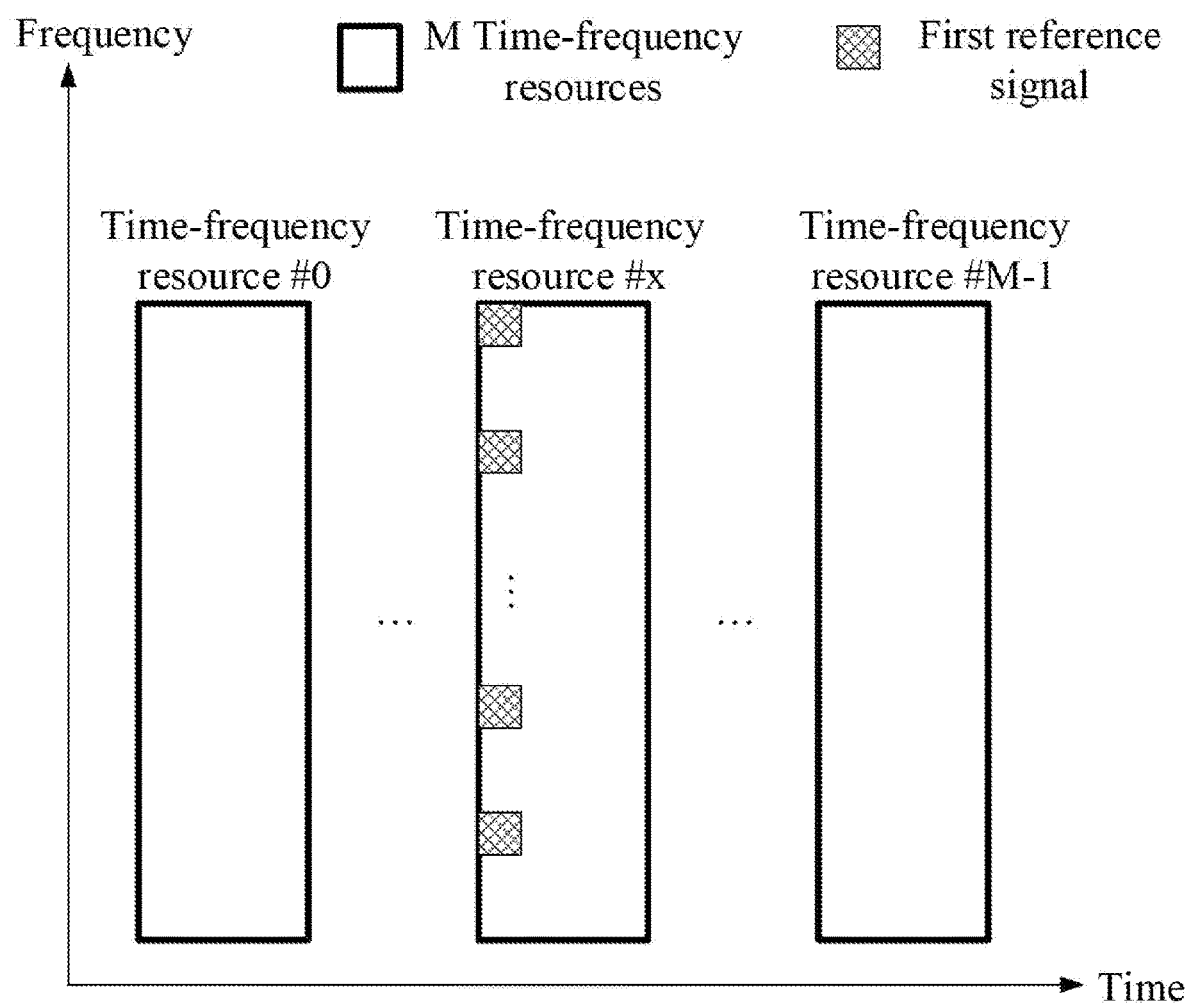
FIG. 21 is a diagram illustrating a resource mapping of a first reference signal in a time-frequency domain according to one embodiment of the present disclosure.

Embodiment 21 illustrates an example of a diagram of a resource mapping of a first reference signal in a time-frequency domain, as shown in FIG. 21.

In Embodiment 21, the first radio signal in the present disclosure includes a first reference signal, the M time-frequency resources in the present disclosure are reserved to the first radio signal, and the UE in the present disclosure determines that the first radio signal can be transmitted in only M1 time-frequency resource(s) among the M time-frequency resources. A position of a time-frequency resource occupied by the first reference signal in the M1 time-frequency resource(s) is unrelated to the M1.

In FIG. 21, boxes having heavy line frames represent the M time-frequency resources, and grids having fine line frames and filled by cross lines represent the first reference signal. Indexes of the M time-frequency resource are {#0, #x, #M−1}, wherein the x is a positive integer less than the M−1.

In one embodiment, the first reference signal includes a Demodulation Reference Signal (DMRS).

In one embodiment, the first reference signal includes a Phase error Tracking Reference Signal (PRTS).

In one embodiment, the first reference signal includes a Sounding Reference Signal (SRS).

In one embodiment, an RS sequence of the first reference signal includes a pseudorandom sequence.

In one embodiment, an RS sequence of the first reference signal includes a Zadoff-Chu sequence.

In one embodiment, the first reference signal occupies one of the M1 time-frequency resource(s).

In one embodiment, the first reference signal occupies an earliest one of the M1 time-frequency resource(s) in the time domain.

In one embodiment, the first reference signal occupies part REs in an earliest one of the M1 time-frequency resource(s) in the time domain.

In one embodiment, the first reference signal occupies a second earliest one of the M1 time-frequency resource(s) in the time domain.

In one embodiment, the first reference signal occupies part REs in a second earliest one of the M1 time-frequency resource(s) in the time domain.

In one embodiment, the first reference signal occupies part REs in a reference time-frequency resource, the reference time-frequency resource is one of the M1 time-frequency resource(s), and an index of the reference time-frequency resource in the M1 time-frequency resource(s) is fixed.

In one subembodiment, all REs occupied by the first reference signal are located in the reference time-frequency resource.

In one subembodiment, the index of the reference time-frequency resource in the M1 time-frequency resource(s) is preconfigured.

In one subembodiment, the index of the reference time-frequency resource in the M1 time-frequency resource(s) is configured by a high-layer signaling.

In one subembodiment, the index of the reference time-frequency resource in the M1 time-frequency resource(s) is default (no configuration is required).

In one embodiment, the first reference signal occupies a plurality of time-frequency resources among the M1 time-frequency resources.

In one subembodiment, the first reference signal occupies part REs in each one of the plurality of time-frequency resources.

In one embodiment, a pattern of the first reference signal in a time-frequency resource block is a pattern of a DMRS in a time-frequency resource block.

In one embodiment, a pattern of the first reference signal in a time-frequency resource block is a pattern of a PTRS in a time-frequency resource block.

In one embodiment, a pattern of the first reference signal in a time-frequency resource block is a pattern of an SRS in a time-frequency resource block.

In one embodiment, one time-frequency resource block is a Physical Resource Block Pair (PRBP).

In one embodiment, the first reference signal is wideband.

In one embodiment, the first frequency subband is divided into a positive integer number of frequency-domain areas, the first reference signal appears on each of the positive integer number of frequency-domain areas, and any one of the positive integer number of frequency-domain areas includes a positive integer number of consecutive subcarriers.

In one subembodiment, any two of the positive integer number of frequency-domain areas include a same number of subcarriers.

In one embodiment, the first reference signal is narrowband.

In one embodiment, the first frequency subband is divided into a positive integer number of frequency-domain areas, the first reference signal appears on only part of the positive integer number of frequency-domain areas, and any one of the positive integer number of frequency-domain areas includes a positive integer number of consecutive subcarriers.

In one subembodiment, any two of the positive integer number of frequency-domain areas include a same number of subcarriers.

Embodiment 22

Figure 22:
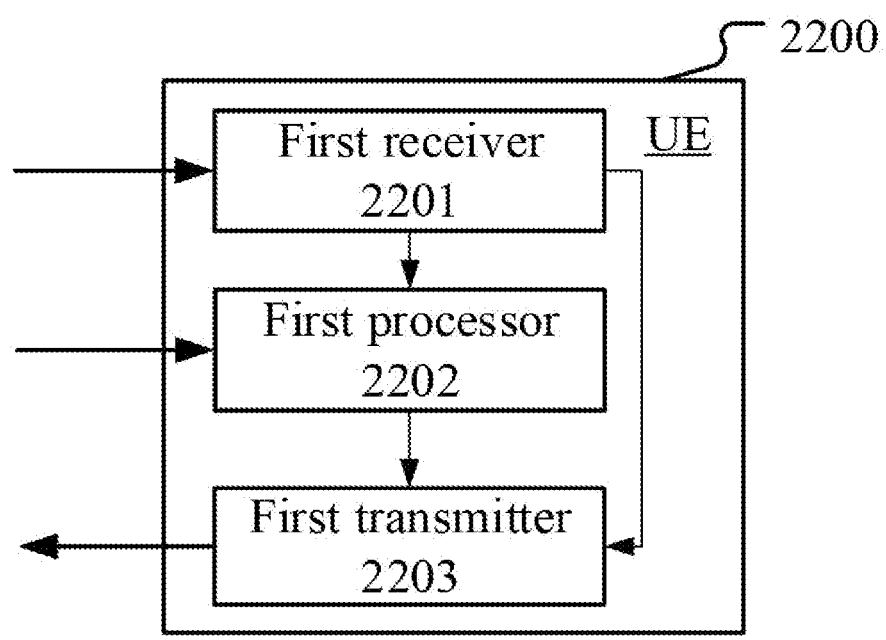
FIG. 22 is a structure block diagram illustrating a processing device in a UE according to one embodiment of the present disclosure.

Embodiment 22 illustrates an example of a structure block diagram of a processing device in a UE, as shown in FIG. 22. In FIG. 22, the processing device 2200 in the UE is mainly composed of a first receiver 2201, a first processor 2202 and a first transmitter 2203.

In Embodiment 22, the first receiver 2201 receives a first signaling, the first signaling is used for determining M time-frequency resources on a first frequency subband, and the M time-frequency resources on the first frequency subband are reserved to a first radio signal; the first processor 2202 determines that the first radio signal can be transmitted in only M1 time-frequency resource(s) among the M time-frequency resources on the first frequency subband; and the first transmitter 2203 transmits the first radio signal in the M1 time-frequency resource(s) on the first frequency subband.

In Embodiment 22, the M is a positive integer, and the M1 is a positive integer not greater than the M; the first radio signal carries a first bit block, and a number of bits contained in the first bit block is related to the M1.

In one embodiment, the first bit block includes N1 bit subblock(s) among N bit subblocks, the N is a positive integer, the N1 is a positive integer not greater than the N, and the N1 is related to the M1.

In one embodiment, for given N and N1, (a) position(s) of the N1 bit subblock(s) in the N bit subblocks is(are) fixed.

In one embodiment, the number of bits contained in the first bit block decreases with decrease of the M1.

In one embodiment, the first processor 2202 further performs M2 time(s) of access detection(s) in M2 time window(s) on the first frequency subband respectively, wherein the M2 time(s) of access detection(s) is(are) used for determining respectively whether M2 time-frequency resource(s) among the M time-frequency resources on the first frequency sub-band can be used to transmit the first radio signal, and the M2 is a positive integer not greater than the M.

In one embodiment, the first radio signal includes a first reference signal, and a position of a time-frequency resource occupied by the first reference signal in the M1 time-frequency resource(s) is unrelated to the M1.

In one embodiment, the first receiver 2201 further receives downlink information, wherein the downlink information is used by the first receiver 2201 to determine the M.

In one embodiment, the first receiver 2201 includes at least one of {the antenna 452, the receiver 454, the receiving processor 456, the channel decoder 458, the controller/processor 459, the memory 460, the data source 467} mentioned in Embodiment 4.

In one embodiment, the first processor 2202 includes at least one of {the antenna 452, the receiver 454, the receiving processor 456, the channel decoder 458, the controller/processor 459} mentioned in Embodiment 4.

In one embodiment, the first transmitter 2203 includes at least one of {the antenna 452, the transmitter 454, the transmitting processor 468, the channel encoder 457, the controller/processor 459, the memory 460, the data source 467} mentioned in Embodiment 4.

Embodiment 23

Figure 23:
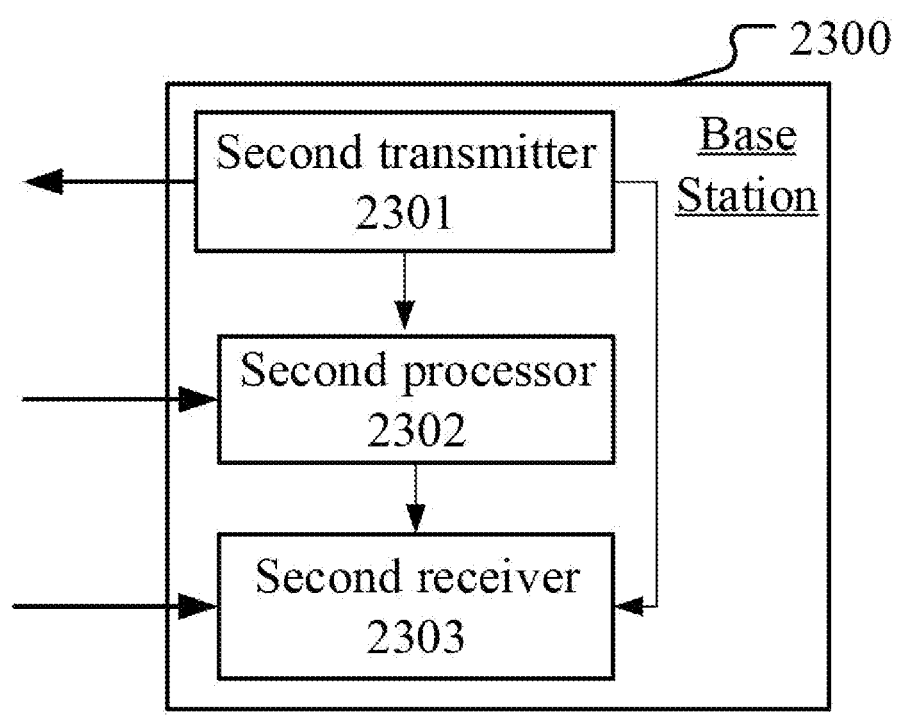
FIG. 23 is a structure block diagram illustrating a processing device in a base station according to one embodiment of the present disclosure.

Embodiment 23 illustrates an example of a structure block diagram of a processing device in a base station, as shown in FIG. 23. In FIG. 23, the processing device 2300 in the base station is mainly composed of a second transmitter 2301, a second processor, 2302 and a second receiver 2303.

In Embodiment 23, the second transmitter 2301 transmits a first signaling, the first signaling is used for determining M time-frequency resources on a first frequency subband, and the M time-frequency resources on the first frequency subband are reserved to a first radio signal; the second processor 2302 determines it is only needed to receive the first radio signal in M1 time-frequency resource(s) among the M time-frequency resources on the first frequency subband; and the second receiver 2303 receives the first radio signal in the M1 time-frequency resource(s) on the first frequency subband, and recovers a first bit block In Embodiment 23, the M is a positive integer, and the M1 is a positive integer not greater than the M; the first radio signal carries a first bit block, and a number of bits contained in the first bit block is related to the M1.

In one embodiment, the first bit block includes N1 bit subblock(s) among N bit subblocks, the N is a positive integer, the N1 is a positive integer not greater than the N, and the N1 is related to the M1.

In one embodiment, for given N and N1, (a) position(s) of the N1 bit subblock(s) in the N bit subblocks is(are) fixed.

In one embodiment, the number of bits contained in the first bit block decreases with decrease of the M1.

In one embodiment, the first radio signal includes a first reference signal, and a position of a time-frequency resource occupied by the first reference signal in the M1 time-frequency resource(s) is unrelated to the M1.

In one embodiment, the second processor 2302 further monitors a first reference signal in M3 time-frequency resource(s) and detects the first reference signal in M4 time-frequency resource(s), the second processor 2302 stops monitoring the first reference signal in any of the M time-frequency resources other than the M3 time-frequency resource(s), the M3 time-frequency resource(s) is(are) a subset of the M time-frequency resources, the M4 time-frequency resource(s) is(are) a subset of the M3 time-frequency resource(s), the M3 is a positive integer not greater than the M, and the M4 is a positive integer not greater than the M3.

In one embodiment, the second transmitter 2301 further transmits downlink information, wherein the downlink information is used for determining the M.

In one embodiment, the second transmitter 2301 includes at least one of {the antenna 420, the transmitter 418, the transmitting processor 416, the channel encoder 477, the controller/processor 475, the memory 476} mentioned in Embodiment 4.

In one embodiment, the second processor 2302 includes at least one of {the antenna 420, the receiver 418, the receiving processor 470, the channel decoder 478, the controller/processor 475} mentioned in Embodiment 4.

In one embodiment, the second receiver 2303 includes at least one of {the antenna 420, the receiver 418, the receiving processor 470, the channel decoder 478, the controller/processor 475, the memory 476} mentioned in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, and other radio communication equipment. The base station or system equipment in the present application includes but not limited to macro-cellular base stations, micro-cellular base stations, home base stations, relay base station, gNB, TRP, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
   receiving a first signaling, the first signaling being used for determining M time-frequency resources on a first frequency subband, the M time-frequency resources on the first frequency subband being reserved to a first radio signal, and the M being a positive integer;
   determining that the first radio signal can be transmitted in only M1 time-frequency resource(s) among the M time-frequency resources on the first frequency subband, the M1 being a positive integer not greater than the M; and
   transmitting the first radio signal in the M1 time-frequency resource(s) on the first frequency subband;
   wherein the first radio signal carries a first bit block, and a number of bits contained in the first bit block is related to the M1, and the number of bits contained in the first bit block decreases with decrease of the M1.

2. The method according to claim 1, wherein the first bit block comprises N1 bit subblock(s) among N bit subblocks, the N is a positive integer, the N1 is a positive integer not greater than the N, and the N1 is related to the M1; or, the first bit block comprises N1 bit subblock(s) among N bit subblocks, the N is a positive integer, the N1 is a positive integer not greater than the N, the N1 is related to the M1, and for given N and N1, (a) position(s) of the N1 bit subblock(s) in the N bit subblocks is(are) fixed.

3. The method according to claim 1, comprising:
   performing M2 time(s) of access detection(s) in M2 time window(s) on the first frequency subband respectively, wherein the M2 time(s) of access detection(s) is(are) used for determining respectively whether M2 time-frequency resource(s) among the M time-frequency resources on the first frequency sub-band can be used to transmit the first radio signal, and the M2 is a positive integer not greater than the M;
   or, receiving downlink information, wherein the downlink information is used for determining the M;
   or, receiving downlink information, and performing M2 time(s) of access detection(s) in M2 time window(s) on the first frequency subband respectively, wherein the M2 time(s) of access detection(s) is(are) used for determining respectively whether M2 time-frequency resource(s) among the M time-frequency resources on the first frequency sub-band can be used to transmit the first radio signal, the M2 is a positive integer not greater than the M, and the downlink information is used for determining the M.

4. The method according to claim 1, wherein the first radio signal comprises a first reference signal, and a position of a time-frequency resource occupied by the first reference signal in the M1 time-frequency resource(s) is unrelated to the M1.

5. A method in a base station for wireless communication, comprising:
   transmitting a first signaling, the first signaling being used for determining M time-frequency resources on a first frequency subband, the M time-frequency resources on the first frequency subband being reserved to a first radio signal, and the M being a positive integer;
   determining it is only needed to receive the first radio signal in M1 time-frequency resource(s) among the M time-frequency resources on the first frequency sub-band, the M1 being a positive integer not greater than the M; and
   receiving the first radio signal in the M1 time-frequency resource(s) on the first frequency subband, and recovering a first bit block;
   wherein the first radio signal carries the first bit block, and a number of bits contained in the first bit block is related to the M1, and the number of bits contained in the first bit block decreases with decrease of the M1.

6. The method according to claim 5, wherein the first bit block comprises N1 bit subblock(s) among N bit subblocks, the N is a positive integer, the N1 is a positive integer not greater than the N, and the N1 is related to the M1; or, the first bit block comprises N1 bit subblock(s) among N bit subblocks, the N is a positive integer, the N1 is a positive integer not greater than the N, the N1 is related to the M1, and for given N and N1, (a) position(s) of the N1 bit subblock(s) in the N bit subblocks is(are) fixed.

7. The method according to claim 5, wherein the first radio signal comprises a first reference signal, and a position of a time-frequency resource occupied by the first reference signal in the M1 time-frequency resource(s) is unrelated to the M1;
   or, the method comprising: monitoring a first reference signal in M3 time-frequency resource(s) and detecting the first reference signal in M4 time-frequency resource(s), and stopping monitoring the first reference signal in any of the M time-frequency resources other than the M3 time-frequency resource(s), wherein the first radio signal comprises the first reference signal, and a position of a time-frequency resource occupied by the first reference signal in the M1 time-frequency resource(s) is unrelated to the M1, the M3 time-frequency resource(s) is(are) a subset of the M time-frequency resources, the M4 time-frequency resource(s) is(are) a subset of the M3 time-frequency resource(s), the M3 is a positive integer not greater than the M, and the M4 is a positive integer not greater than the M3.

8. A UE for wireless communication, comprising:

a first receiver, to receive a first signaling, the first signaling being used for determining M time-frequency resources on a first frequency subband, the M time-frequency resources on the first frequency subband being reserved to a first radio signal, and the M being a positive integer;

a first processor, to determine that the first radio signal can be transmitted in only M1 time-frequency resource(s) among the M time-frequency resources on the first frequency subband, the M1 being a positive integer not greater than the M; and a first transmitter, to transmit the first radio signal in the M1 time-frequency resource(s) on the first frequency subband;

wherein the first radio signal carries a first bit block, and a number of bits contained in the first bit block is related to the M1, and the number of bits contained in the first bit block decreases with decrease of the M1.

9. The UE according to claim 8, wherein the first bit block comprises N1 bit subblock(s) among N bit subblocks, the N is a positive integer, the N1 is a positive integer not greater than the N, and the N1 is related to the M1.

10. The UE according to claim 9, wherein for given N and N1, (a) position(s) of the N1 bit subblock(s) in the N bit subblocks is(are) fixed.

11. The method according to claim 5, comprising: transmitting downlink information, wherein the downlink information is used for determining the M.

12. The UE according to claim 8, wherein the first processor further performs M2 time(s) of access detection(s) in M2 time window(s) on the first frequency subband respectively, wherein the M2 time(s) of access detection(s) is(are) used for determining respectively whether M2 time-frequency resource(s) among the M time-frequency resources on the first frequency sub-band can be used to transmit the first radio signal, and the M2 is a positive integer not greater than the M.

13. The UE according to claim 8, wherein the first radio signal comprises a first reference signal, and a position of a time-frequency resource occupied by the first reference signal in the M1 time-frequency resource(s) is unrelated to the M1.

14. The UE according to claim 8, wherein the first receiver further receives downlink information, wherein the downlink information is used for determining the M.

15. A base station for wireless communication, comprising:

a second transmitter, to transmit a first signaling, the first signaling being used for determining M time-frequency resources on a first frequency subband, the M time-frequency resources on the first frequency subband being reserved to a first radio signal, and the M being a positive integer;

a second processor, to determine it is only needed to receive the first radio signal in M1 time-frequency resource(s) among the M time-frequency resources on the first frequency subband, the M1 being a positive integer not greater than the M; and a second receiver, to receive the first radio signal in the M1 time-frequency resource(s) on the first frequency subband, and to recover a first bit block;

wherein the first radio signal carries the first bit block, and a number of bits contained in the first bit block is related to the M1, and the number of bits contained in the first bit block decreases with decrease of the M1.

16. The base station according to claim 15, wherein the first bit block comprises N1 bit subblock(s) among N bit subblocks, the N is a positive integer, the N1 is a positive integer not greater than the N, and the N1 is related to the M1; or, the first bit block comprises N1 bit subblock(s) among N bit subblocks, the N is a positive integer, the N1 is a positive integer not greater than the N, the N1 is related to the M1, and for given N and N1, (a) position(s) of the N1 bit subblock(s) in the N bit subblocks is(are) fixed.

17. The base station according to claim 15, wherein the second transmitter further transmits downlink information, wherein the downlink information is used for determining the M.

18. The base station according to claim 15, wherein the first radio signal comprises a first reference signal, and a position of a time-frequency resource occupied by the first reference signal in the M1 time-frequency resource(s) is unrelated to the M1;

or, the second processor further monitors a first reference signal in M3 time-frequency resource(s) and detects the first reference signal in M4 time-frequency resource(s), and stops monitoring the first reference signal in any of the M time-frequency resources other than the M3 time-frequency resource(s), wherein the first radio signal comprises the first reference signal, and a position of a time-frequency resource occupied by the first reference signal in the M1 time-frequency resource(s) is unrelated to the M1, the M3 time-frequency resource(s) is(are) a subset of the M time-frequency resources, the M4 time-frequency resource(s) is(are) a subset of the M3 time-frequency resource(s), the M3 is a positive integer not greater than the M, and the M4 is a positive integer not greater than the M3.

\* \* \* \* \*